US012113278B2

(12) United States Patent
Kim et al.

(10) Patent No.: US 12,113,278 B2
(45) Date of Patent: Oct. 8, 2024

(54) RADAR RETROREFLECTIVE ARTICLE

(71) Applicant: 3M INNOVATIVE PROPERTIES COMPANY, St. Paul, MN (US)

(72) Inventors: Jaewon Kim, Woodbury, MN (US); Mohsen Salehi, Woodbury, MN (US); Michael A. McCoy, St. Paul, MN (US); Susannah C. Clear, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 388 days.

(21) Appl. No.: 17/608,046

(22) PCT Filed: May 21, 2020

(86) PCT No.: PCT/IB2020/054840

§ 371 (c)(1),
(2) Date: Nov. 1, 2021

(87) PCT Pub. No.: WO2020/240364

PCT Pub. Date: Dec. 3, 2020

(65) Prior Publication Data

US 2022/0216616 A1 Jul. 7, 2022

Related U.S. Application Data

(60) Provisional application No. 62/852,668, filed on May 24, 2019.

(51) Int. Cl.

| | |
|---|---|
| ***H01Q 15/23*** | (2006.01) |
| ***H01Q 15/08*** | (2006.01) |
| ***H01Q 15/18*** | (2006.01) |

(52) U.S. Cl.
CPC ............ *H01Q 15/23* (2013.01); *H01Q 15/08* (2013.01); *H01Q 15/18* (2013.01)

(58) Field of Classification Search
CPC ......... H01Q 15/23; H01Q 15/08; H01Q 15/18
(Continued)

(56) References Cited

U.S. PATENT DOCUMENTS 4,703,999 A * 11/1987 Benson .................. G02B 5/124 427/166
4,761,055 A * 8/1988 Hatje ..................... H01Q 15/18 359/530
(Continued)

FOREIGN PATENT DOCUMENTS

DE 102010032063 5/2011
EP 0135740 4/1985
(Continued)

OTHER PUBLICATIONS

Bird, "M365 Model Repair Guide", (Retrieved from Internet Mar. 25, 2019), URL <https://bird.zendesk.com/hc/en-us/articles/360015313392-M365-Model-Repair-Guide>, 34 pages.
(Continued)

*Primary Examiner* — Nuzhat Pervin

(57) ABSTRACT

This disclosure relates generally to radar retroreflective articles comprising one or more dielectric layers adjacent to a reflective layer, wherein the dielectric layer or layers aids in increasing the radar cross section of the radar retroreflective articles.

14 Claims, 8 Drawing Sheets

(58) Field of Classification Search
USPC .............................................................. 342/5
See application file for complete search history.

(56) References Cited

U.S. PATENT DOCUMENTS

| | | | | | |
|---|---|---|---|---|---|
| 5,775,452 | A * | 7/1998 | Patmont | B62K 3/002 180/181 |
| 5,976,669 | A * | 11/1999 | Fleming | C08G 18/718 427/163.4 |
| 5,988,821 | A * | 11/1999 | Tanaka | G02B 5/128 359/538 |
| 6,005,511 | A * | 12/1999 | Young | H01Q 1/3233 342/70 |
| 6,517,923 | B1 * | 2/2003 | Nakayama | E01F 9/669 359/530 |
| 6,742,903 | B2 * | 6/2004 | Canning | G02B 5/12 342/7 |
| 7,396,579 | B2 * | 7/2008 | Owusu | G02B 5/124 359/530 |
| 7,506,987 | B2 * | 3/2009 | Nilsen | G02B 5/124 359/530 |
| 7,703,931 | B2 * | 4/2010 | Nilsen | G02B 5/124 359/836 |
| 8,730,014 | B2 * | 5/2014 | Fullerton | G01S 13/878 340/572.1 |
| 9,124,004 | B2 * | 9/2015 | Rard | H01Q 15/18 |
| 10,866,346 | B2 * | 12/2020 | Buoni | G02B 5/045 |
| 2003/0021029 | A1 * | 1/2003 | Mimura | G02B 5/124 359/530 |
| 2003/0222778 | A1 * | 12/2003 | Piesinger | G01S 15/003 340/541 |
| 2004/0227997 | A1 * | 11/2004 | Owusu | B32B 27/304 359/530 |
| 2005/0185279 | A1 * | 8/2005 | Mullen | G02B 5/124 359/530 |
| 2006/0139754 | A1 * | 6/2006 | Bacon | G02B 5/124 359/530 |
| 2006/0165961 | A1 * | 7/2006 | Tsutsui | G09F 13/16 428/192 |
| 2010/0033389 | A1 * | 2/2010 | Yonak | H01Q 15/0086 343/755 |
| 2013/0185847 | A1 * | 7/2013 | Steenson | A41D 31/00 2/243.1 |
| 2014/0203997 | A1 * | 7/2014 | Perricone | H01Q 1/34 343/912 |
| 2014/0266860 | A1 * | 9/2014 | Blumrosen | G01S 15/66 367/87 |
| 2017/0276844 | A1 * | 9/2017 | McCoy | G02B 5/128 |
| 2018/0128910 | A1 * | 5/2018 | Lee | G01S 13/426 |
| 2018/0222473 | A1 * | 8/2018 | Shami | B62J 6/24 |
| 2018/0337460 | A1 * | 11/2018 | Kinsler | H01Q 3/46 |
| 2019/0049958 | A1 * | 2/2019 | Liu | G01S 17/00 |
| 2020/0319384 | A1 * | 10/2020 | Pavelka | G02B 5/208 |
| 2022/0275175 | A1 * | 9/2022 | Newton | C08K 3/22 |
| 2022/0320745 | A1 * | 10/2022 | Salehi | H01Q 15/18 |
| 2023/0390604 | A1 * | 12/2023 | Hugmark | G01S 13/584 |

FOREIGN PATENT DOCUMENTS

| | | | | |
|---|---|---|---|---|
| EP | 0881333 | | 12/1998 | |
| EP | 2261701 | B1 * | 8/2021 | B29C 43/021 |
| EP | 3712809 | A1 * | 9/2023 | G01S 13/46 |
| NL | 1020017 | | 8/2003 | |
| WO | WO 2004-081619 | | 9/2004 | |
| WO | WO 2014-082821 | | 6/2014 | |
| WO | WO 2015-034828 | | 3/2015 | |
| WO | WO 2019-148000 | | 8/2019 | |

OTHER PUBLICATIONS

Citylab, "Behind the Big Promises of the Micromobility Industry", (Retrieved from Internet Mar. 25, 2019), URL <https://www.citylab.com/transportation/2019/02/micromobility-conference-electric-scooters-bike-share/581791/>, 7 pages.

Doctorow, "A Guide to The Valuable Electronics Inside Bird's Illegal-In-San Francisco Scooters", Boing Boing (Retrieved from Internet Mar. 25, 2019), URL <https://boingboing.net/2018/05/25/drinkbot-anyone.html>, 6 pages.

Hawkins, "The Electric Scooter Craze is Officially One Year Old—What's Next?", The Verge, Sep. 20, 2018 (Retrieved from Internet Mar. 25, 2019), URL <https://www.theverge.com/2018/9/20/17878676/electric-scooter-bird-lime-uber-lyft>, 8 pages.

Holley, "Scooter use is Rising in Major Cities. So Are Trips to the Emergency Room", The Washington Post, Sep. 6, 2018 (Retrieved from Internet Mar. 25, 2019), URL <https://www.washingtonpost.com/business/economy/scooter-use-is-rising-in-major-cities-so-are-trips-to-the-emergency-room/2018/09/06/53d6a8d4-abd6-11e8-a8d7-Of63ab8b1370_story.html>, 6 pages.

Marshall, "Micromobility: The Prose and Poetry of the Scooter-Faithful", Wired, Apr. 2, 2019 (Retrieved from Internet Mar. 25, 2019), URL <https://www.wired.com/story/micromobility-conference-scooters-bikes/>, 8 pages.

Particle Datasheet, "E Series Module Datasheet (V001)", (Retrieved from Internet Mar. 25, 2019), URL <https://docs.particle.io/datasheets/cellular/e-series-datasheet/>, 35 pages.

Populus, "The Micro-Mobility Revolution: The Introduction and Adoption of Electric Scooters in the United States", A Populus Research Report, Jul. 2018, 18 pages.

Robinson, "A Startup in the West Coast Scooter Sharing Craze is Already Worth $1 Billion—Here's What it's Like to Ride a Bird Scooter", Business Insider, May 30, 2018 (Retrieved from Internet Mar. 25, 2019), URL <https://www.businessinsider.com/bird-electric-scooter-review-2018-4>, 28 pages.

Senese, "Vandals Crack Open Dockless Scooter, Discover Particle Electron Board Inside: Make", Apr. 25, 2018 (Retrieved from Internet Mar. 25, 2019), URL <https://makezine.com/2018/04/25/vandals-crack-open-dockless-scooter-discover-particle-electron-board-inside/>, 6 pages.

Vock, "Scooters Are Suddenly Everywhere. What Should Cities Be Doing About It?", Nov. 27, 2018 (Retrieved from Internet Mar. 25, 2019), URL <https://www.governing.com/topics/transportation-infrastructure/gov-electric-scooters-bird.html>, 5 pages.

International Search Report for PCT International Application No. PCT/IB2020/054840, mailed on Aug. 11, 2020, 3 pages.

* cited by examiner

RADAR RETROREFLECTIVE ARTICLE

CROSS REFERENCE TO RELATED APPLICATIONS

This application is a national stage filing under 35 U.S.C. 371 of PCT/IB2020/054840, filed May 21, 2020, which claims the benefit of U.S. Provisional Application No. 62/852,668, filed May 24, 2019, the disclosures of which are incorporated by reference in their entireties herein.

This disclosure relates generally to radar retroreflective articles comprising one or more dielectric layers adjacent to a reflective layer, wherein the dielectric layer or layers aids in increasing the radar cross section of the radar retroreflective articles.

BACKGROUND

Radar-based systems are widely implemented for automotive and autonomous driving applications such as adaptive cruise control, parking assistants, lane-change assistants, and blind spot monitoring, among others. There is currently a need to have automotive radar systems that can distinguish objects on a roadway with greater accuracy and under more challenging weather conditions than optical camera systems, or simply to serve as a redundant source of data. The present inventors have also identified a need to have increased detectability of workers beyond visible retroreflective personal safety garments and equipment. This disclosure provides articles that address the needs described in this paragraph by providing radar reflective articles with improved radar-reflection performance.

SUMMARY

In general, this disclosure is directed to a reflective article that comprises a dielectric layer and a reflective structure capable of reflecting a radar signal. Examples of useful reflective articles include a marking tape, traffic cone or barrel, roadway sign, guardrail, automotive parts, as well as wearable articles, such as articles or clothing, helmets, badges, and other similar articles.

In one embodiment, the radar reflective structure comprises a retroreflective layer capable of reflecting a radar signal, which in turn may comprise cube corner elements (e.g., having a side dimension from 2 mm to 65 mm), and a metallic layer coated on the cube corner elements. In other embodiments, the radar reflective structure may include a plurality of antennas that create a radar reflecting surface, or may even be a reflector comprising one or more metallic layers capable of reflecting a radar signal.

In some embodiments, the dielectric layer may be a single layer that diffracts the incident radar signal so that the incident angle of the signal on the reflective layer has increased with respect to the incident angle on the surface of the dielectric layer. This radar signal refraction allows reflection of the radar signal in the general direction of the signal source by the reflective article for radar signals with low incident angles with respect to the plane of the reflective article. In other embodiments, the dielectric layer may be a plurality of layers, each having a decreasing permittivity value, from a high permittivity in the layer adjacent the radar reflective structure to low permittivity in the outermost layer, which is generally in contact with air. Alternatively, in other embodiments, the dielectric layer may have a gradient of permittivities having a high permittivity in the portion of the layer adjacent the radar reflective structure and low permittivity in the outermost portion, generally in contact with air.

All scientific and technical terms used herein have meanings commonly used in the art unless otherwise specified. The definitions provided herein are to facilitate understanding of certain terms used frequently in this application and are not meant to exclude a reasonable interpretation of those terms in the context of the present disclosure.

Unless otherwise indicated, all numbers in the description and the claims expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. a range from 1 to 5 includes, for instance, 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "radar signal" refers to electromagnetic radiation having a frequency in the range from 1 GHz to 120 GHz. A radar signal includes, but is not limited to, electromagnetic radiation having a nominal frequency of 24 GHz, which in this disclosure is considered as having a range from 21 GHz to 27 GHz, signals nominally having a frequency of 77 GHz, which in this disclosure is consider as having a range from 76 GHz to 81 GHz, and signals nominally having a frequency of 110 GHz, which in this disclosure is considered as having a range from 105 GHz to 115 GHz.

The term "opaque" refers to a property of an item, such as a layer in a film construction, that allows less than 80% visible light transmission by the item. Visible light in this disclosure refers to electromagnetic radiation having a wavelength in the range from 400 nm to 740 nm.

The term "cube corner element" refers to structures capable of retroreflecting electromagnetic radiation. Cube corner elements include truncated cube corner arrays in which the base edges of adjacent cube corner elements are typically coplanar. See, for example, FIG. 3*a*. Other cube corner element structures, described as "full cubes", typically comprise at least two non-dihedral edges that are not coplanar. See, for example, FIG. 3*b*. Such structures typically exhibit a higher total light return in comparison to truncated cube corner elements. Examples of cube corner elements are described in PCT Application No. WO 2004/081619, which is incorporated herein in its entirety.

The term "adjacent" refers to the relative position of two elements, such as, for example, two layers, that are close to each other and may or may not be necessarily in contact with each other or that may have one or more layers separating the two elements as understood by the context in which "adjacent" appears.

The term "immediately adjacent" refers to the relative position of two elements, such as, for example, two layers, that are next to each other and in contact with each other and have no intermediate layers separating the two elements. The term "immediately adjacent," however, encompasses situations where one or both elements (e.g., layers) have been treated with a primer, or whose surface has been modified to affect the properties thereof, such as etching, embossing, etc., or has been modified by surface treatments, such as corona or plasma treatment, etc. that may improve adhesion or provide diffusion of incoming electromagnetic radiation.

The term "radar cross section" (RCS) is a measure of an object's ability to reflect radar signal in the direction of the radar receiver. In this disclosure, RCS is calculated as shown in the Example section below.

The term "retroreflect," "retroreflected," or "retroreflection" refers to reflecting a signal back in the direction of the source using a retroreflective item (e.g., an item comprising a corner cube layer). As used herein, the term "retroreflected" is a subset of the term "reflected."

The above summary is merely intended to provide a cursory overview of the subject matter of the present disclosure and is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

Figure 1:
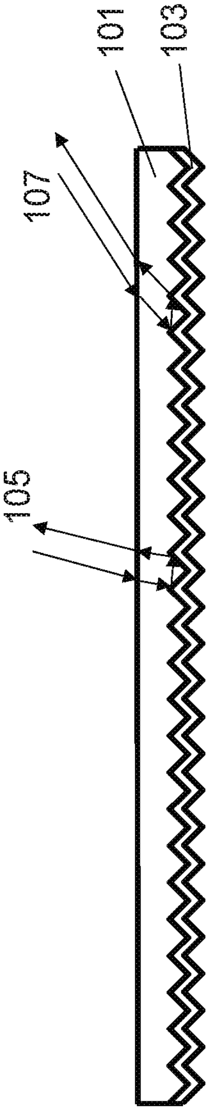
FIG. 1 is a schematic description of an optical metallic retroreflector.

| List of numbered items in Figures |
| --- |
| 101 - Transparent Polymer Layer |
| 103 - Metal Layer |
| 105 - Retroreflected Light Ray with Low Oblique Incident Angle |
| 107 - Retroreflected Light Ray with High Oblique Incident Angle |
| 201 - Metal Layer |
| 203 - Dielectric Layer |
| 205 - Reflected Radar Ray with Low Oblique Incident Angle |
| 207 - Reflected Radar Ray with High Oblique Incident Angle |
| 209 - Retroreflected Radar Ray with Low Oblique Incident Angle |
| 211 - Reflected Radar Ray with High Oblique Incident Angle |
| 401 - Retroreflected Radar Ray with Low Oblique Incident Angle |
| 403 - Reflected Radar Ray with High Oblique Incident Angle |
| 501 - Retroreflected Radar Ray with Low Oblique Incident Angle |
| 503 - Retroreflected Radar Ray with High Oblique Incident Angle |
| 601 - Retroreflected Radar Ray with Low Oblique Incident Angle |
| 603 - Retroreflected Radar Ray with High Oblique Incident Angle |
| 605 - Dielectric layer |
| 607 - Metallic layer |
| 609 - Prismatic layer |

-continued

| List of numbered items in Figures |
| --- |
| 611 - Adhesive layer |
| 701 - Retroreflected Radar Ray with Low Oblique Incident Angle |
| 703 - Retroreflected Radar Ray with High Oblique Incident Angle |
| 705 - Second dielectric layer |
| 707 - First dielectric layer |
| 709 - Metallic layer |
| 801 - Pure resin, low ϵ |
| 803 - Composite of high and low ϵ High permittivity particles with higher density to stratify during coating, drying. Sphere size based on minimal interfacial scattering. |
| 805 - Pure resin, low ϵ |
| 807 - Composite of high ϵ plates or rods for improved packing) low ϵ |
| 809 - Pure resin, low ϵ |
| 811 - Composite of high ϵ (spheres with distributed size) and low ϵ matrix. Sphere size distribution design to affect packing efficiency and average permittivity. |
| 813 - Pure resin, low ϵ |
| 815 - Composite of high ϵ (spheres with distributed size) and low ϵ matrix. Sphere size distribution design to affect packing efficiency and average permittivity. |
| 817 - Pure resin, low ϵ |
| 819 - Composite of high and low ϵ Intermediate average permittivity compared to 817 and 821 |
| 821 - Composite of high ϵ plates or rods for improved packing) low ϵ |
| 823 - Pure resin, low ϵ |
| 825 - Composite of high and low ϵ High permittivity particles with higher density to stratify during coating, drying. Sphere size based on minimal interfacial scattering. |

DETAILED DESCRIPTION

Autonomous vehicles and Automated Driver Assist Systems (ADAS) may use various sensors, including radar systems, to perceive the environment, infrastructure, and other objects around the vehicle. Radar systems typically comprise a radar signal emitting device (radar emitter) and a radar radiation detecting device (radar detector) for detecting reflected radar signals, for example redirected from other vehicles, obstacles, or roadway infrastructure. The radar emitter is typically installed less than one meter above ground and reflected radar signals originate from elements at distances typically measured from a few feet to tens of feet to a few hundred feet. The detected reflected signals may then be processed to provide additional information about the position of the objects reflecting the radar signals.

By their nature of operation, radar systems require that items to be detected have a surface that is not only capable of reflecting a radar signal, but that is also oriented in such a way that the reflected signal is directed towards the radar detector.

For a typical vehicle radar system, focused on scanning the environment ahead of the vehicle, the radar signal has a relatively small incident angle with respect to pavement markings, such as center line markings and lane dividers, making that type of items challenging to detect by radar systems. The same problem exists with moving objects where the angle of the reflective surface is subject to change, such as is the case with moving humans or moving/turning micromobility vehicle such as scooters, motorcycles, bicycles, etc.

In one aspect of this disclosure, the radar reflective articles of the present disclosure aim to facilitate the detection and identification of those objects where the incident angle of the radar signal is relatively low with respect to a plane containing the object to be detected. Those radar reflective articles can be part of pavement markings and wearable items, such as vests or helmets lacking the typical perpendicular flat surfaces preferred for reflecting radar signals back to the radar detector. Nonetheless, in other aspects, the reflective articles described herein can also be used to improve detection of other permanent or semi-permanent roadway infrastructure such as railguards, posts, signs (e.g., a stop sign, yield sign, other informational signs, etc), concrete barriers, temporary traffic signs (e.g., a traffic cone or barrel), mile markers, a license plate, a decal or similar articles attached to a vehicle, etc.

Figure 6:
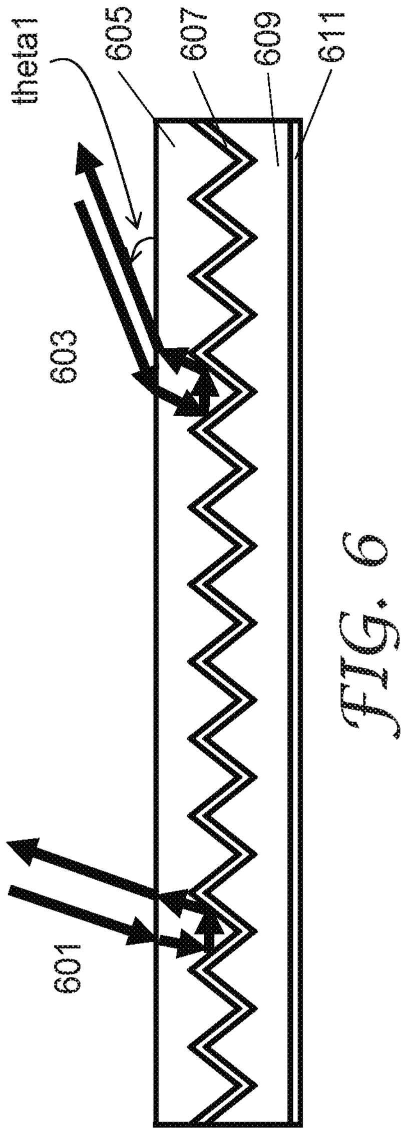
FIG. 6 shows retroreflection of radar signals by a construction having a dielectric layer with a suitable (high) permittivity and explicitly showing a prismatic layer.

In general, the radar reflective articles of the present disclosure increase the radar signal reflected back to the radar detector by increasing the incident angle of the radar signal with respect to the radar reflecting surface. The incident angle of the radar signal is increased by refracting the radar signal by means of a dielectric layer of relatively high permittivity. For example, as shown in FIG. 6, the radar signal 603 has a relatively low incident angle (tethal) with respect to the surface of the dielectric layer 605, but has a higher incident angle with respect to the plane of the reflective layer 607. In other words, in essence, the reflective articles of this disclosure may increase the radar cross section of radar reflecting structures by the addition of suitable dielectric layers as described herein.

In some embodiments, a radar reflective article is a reflective item that comprises a reflective layer capable of reflecting a radar signal and a dielectric layer adjacent the reflective layer wherein the dielectric layer has a permittivity from 4 to 100. Unless otherwise specified, the term "permittivity" in this disclosure refers to the relative permittivity ($C_r$), which is the permittivity of the material divided by the permittivity of vacuum, (Co). In other embodiments, the permittivity of the dielectric layer is from 4 to 50, from 4 to 30, from 4 to 25, from 2 to 20, from 2 to 15, from 4 to 10, and from 4 to 8.

In certain preferred embodiments, the dielectric layer is not transparent to visible light and is instead opaque. The thickness of the dielectric layer can vary depending on its permittivity value. For example, for higher permittivity the thickness of the dielectric layer may be lower than for dielectric layer with lower permittivity. In some embodiments, the thickness of the dielectric layer is from 0.2 mm to 25 mm, from 0.2 mm to 20 mm, from 0.2 mm to 15 mm, from 0.2 mm to 10 mm, from 0.2 mm to 5 mm, from 0.2 mm to 3 mm, from 0.2 mm to 1 mm.

In certain embodiments, the reflective layer is a retroreflective layer that comprises cube corner element layer and a metallic layer coated on the cube corner elements. In some instances, the cube corner element layer may comprise a body portion typically having a substantially planar front surface and a structured rear surface comprising a plurality of cube corner elements. Cube corner elements may be truncated cube corner arrays (e.g., FIG. 3(*a*)) or full cube corner elements (e.g., FIG. 3(*b*). Regardless of the type, each cube corner element includes three approximately mutually perpendicular optical faces to retroreflect incident radiation.

In some embodiments, the lateral dimension of cube corner elements is from 2 mm to 65 mm, from 2 mm to 50 mm, from 2 mm to 40 mm, from 2 mm to 30 mm, from 2 mm to 20 mm, from 2 mm to 10 mm, and from 2 mm to 5 mm. In other embodiments, the lateral dimension of cube corner elements is from 5 mm to 65 mm, from 5 mm to 50 mm, from 5 mm to 40 mm, from 5 mm to 30 mm, from 5 mm to 20 mm, and from 5 mm to 10 mm.

In other embodiments, the reflective layer comprises radar reflective structures, such as suitable antennas that cause the reflected radar radiation to send the energy back toward the radar transceiver. For instance, the radar reflective structure may include a plurality of antennas spaced on a planar surface to receive incident radar waves and reflect radar waves in the direction from which they are received. The spacing of the antennas may be determined as a function of angle of incidence and the expected frequency of the radar. In this embodiment, the antennas may be linear slot antennas, u-shaped antennas, or other shapes of antennas.

In other embodiments, the reflective layer comprises a continuous metal layer. Suitable metals for the metal layer include copper, aluminum, silver, gold, iron, or combinations or alloys thereof. Continuous metal layers may be beneficial because these are easy to apply and may provide a reliable reflection of a radar signal.

Similarly, in some embodiments, the reflective layer may comprise elements that are electrically conductive, or that render the layer electrically conductive, for instance, at least one discrete metallic element. Again, suitable metals for the metallic elements may include copper, aluminum, silver, iron, gold, or combinations or alloys thereof. The discrete metallic elements may be formed of a metal. Alternatively, the discrete metallic elements may be formed of a non-metallic material (for instance a non-metal carrier comprising ceramics, carbon fibers, glass fibers, epoxy and combinations thereof) with a metallic coating thereon. Such discrete metallic elements may be beneficial as they may help to save material compared to a continuous metal layer.

Yet in other embodiments, the reflective layer comprises a conductive layer that includes a conductive material, such as a layer of bulk metal, foils, and conductive coatings. In such examples, the reflective layer may be formed by etching, or otherwise removing, portions of the conductive layer. In other words, the reflective layer may include a conductive layer where a portion of the conductive layer has been removed in the shape of radar reflecting structures, such that the radar reflecting structures form an open or empty region in the conductive material.

In other embodiments, the reflective layer may include a conductive material that is placed on, or embedded in, a non-conductive dielectric layer or sheet. The conductive material may be copper or other metal material etched on non-conducting substrate. In another example, the conductive material may include any metal or conductive material deposited via masked vapor deposition, microcontact printing, conductive ink or other suitable processes onto a non-conducting substrate. In other words, the reflective layer may formed by depositing conductive material on another layer, rather than removing conductive material from a conductive layer.

In general, the reflective layer may be configured to reflect radar radiation of a particular wavelength, such as radiation having a nominal frequency of 24 GHz, in the range from 21 GHz to 27 GHz, signals nominally having a frequency of 77 GHz, having a range from 76 GHz to 81 GHz, and signals nominally having a frequency of 110 GHz, having a range from 105 GHz to 115 GHz. It is to be understood that the wavelengths are example wavelengths only and that other ranges of wavelengths are possible.

To simplify the disclosure and explanation of the following Figures, the description may refer to a pavement marking. However, the radar reflective articles of this disclosure may equally apply in examples in which the reflective articles are part of wearable items such as vests and helmets, as well as other planar structure affixed to a vehicle (e.g., a license plate, a decal, or similar article) or affixed to other roadway substrates, such as barriers, traffic signals, temporary traffic control items, and all other articles previously described.

FIG. 1 refers to typical retroreflective sheeting for retroreflecting visible light (105, and 107), generally comprising a retroreflective layer (101) and a metallic layer (103). The figure shows two types of visible light rays, a ray 105 having an incidence angle relatively high, and ray 107 having a lower incidence angle. In both cases, the refraction of the visible light is small compared to the refraction by the relatively high permittivity dielectric layers of the present reflective articles.

Figure 2B:
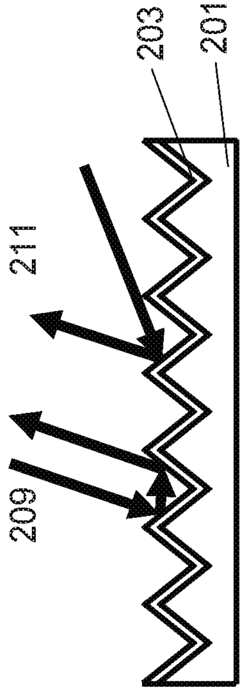
FIG. 2(B) is a schematic representation of a radar signal being retroreflected by a retroreflective item (such as cube corner elements) having a cube corner dimension suitable to reflect the wavelength of the incoming radar signal.
Figure 2A:
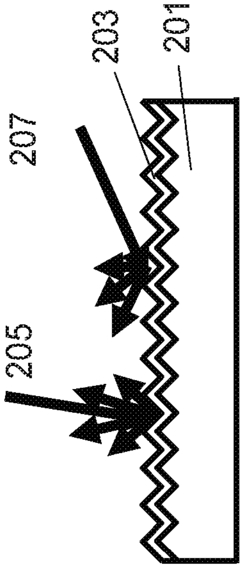
FIG. 2(A) is a schematic representation of a radar signal being scattered by a retroreflective item (such as cube corner elements) having a cube corner dimension smaller than the wavelength of the incoming radar signal.
Figure 3A:
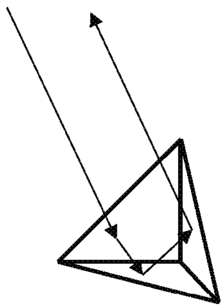
FIGS. 3(A) to 3(D) are graphical representations of retroreflective elements: (a) truncated cube corner, (b) full cube corner, (c) a flat two-face groove, and (d) concave two-face groove.
Figure 3B:
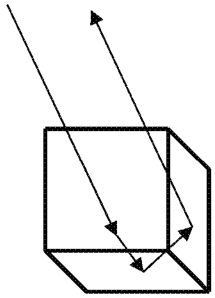
Figure 3C:
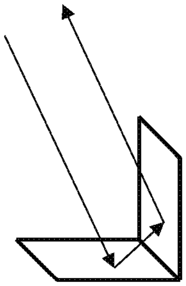
Figure 3D:
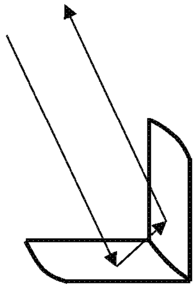

FIG. 2 shows retroreflective sheeting for retroreflecting visible light (FIG. 2(*a*)) and for retroreflecting a radar signal (FIG. 2(*b*)). The retroreflective sheeting comprises a retroreflective layer (201) and a metallic layer (203). FIG. 2(*a*) shows two types of radar signals: (1) a radar signal 205 having a relatively high incidence angle, and (2) a radar signal 207 having a relatively low incidence angle. Neither radar signal is retroreflected because the size of the cube corner elements is not suitable for the wavelength of the radar signal. FIG. 2(*b*) shows two types of radar signals: (1) a radar signal 209 having a relatively high incidence angle, and (2) a radar signal 211 having a relatively low incidence angle. In this case, only the radar signal having the relatively high incidence angle is retroreflected, whereas the signal having a relatively low incidence angle is simply reflected in a direction different from the direction of the radar signal source. In this case, the retroreflective sheeting of FIG. 2(*b*) lacks a dielectric layer of a suitable permittivity, contrary to the reflective articles of the present disclosure.

FIG. 3 shows different examples of retroreflective elements: FIG. 3(*a*) shows a truncated cube corner, FIG. 3(*b*) shows a full cube corner, FIG. 3(*c*) shows a flat two-face groove, and FIG. 3(*d*) shows a concave two-face groove.

Figure 4:
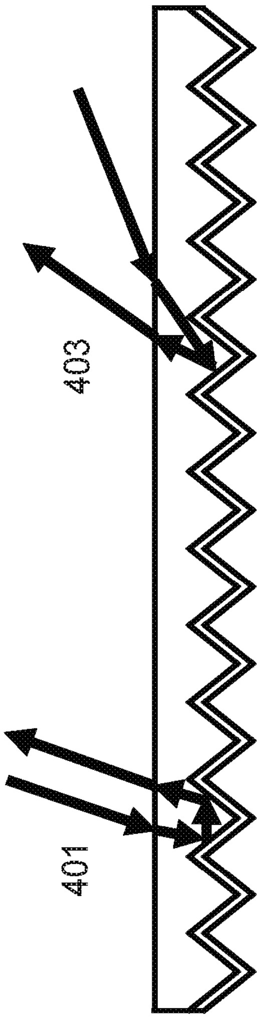
FIG. 4 shows retroreflection of radar signals by a construction having a dielectric layer with a relatively low permittivity.

FIG. 4 shows retroreflective sheeting suitable for retroreflecting a radar signal. However, this sheeting either entirely lacks a dielectric layer, or comprises a dielectric layer that has a relatively low permittivity. The results are similar to those of FIG. 2(*b*). This retroreflective sheeting is only capable of retroreflecting a radar signal that has a relatively high incidence angle (401). The radar signal having a relatively low incidence angle (403) is reflected, but not in the direction of the signal source (i.e., not retroreflected).

Figure 5:
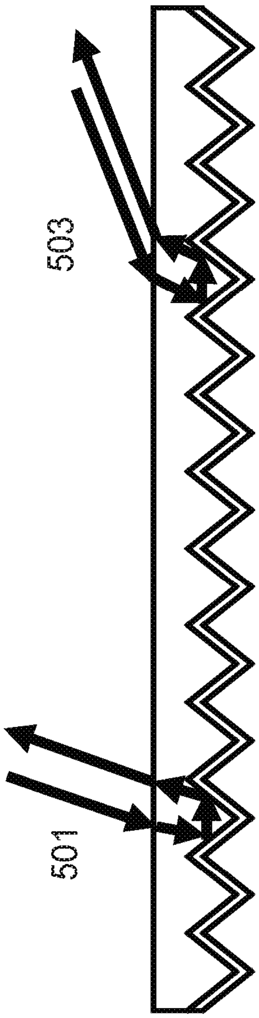
FIG. 5 shows retroreflection of radar signals by a construction having a dielectric layer with a suitable (high) permittivity.

FIG. 5 shows retroreflective sheeting according to the present disclosure, having a relatively high permittivity value. In this case, both radar signals (501 and 503) are retroreflected, including the radar signal that has a relatively low incidence angle.

FIG. 6 shows retroreflective sheeting according to the present disclosure in more detail. The retroreflective sheeting of FIG. 6 is similar to the retroreflective sheeting of FIG. 5, except that it shows the prismatic layer (609) and an optional adhesive layer (611). In this case, both radar signals 601 and 603 are being suitably retroreflected back to the signal source.

Figure 7:
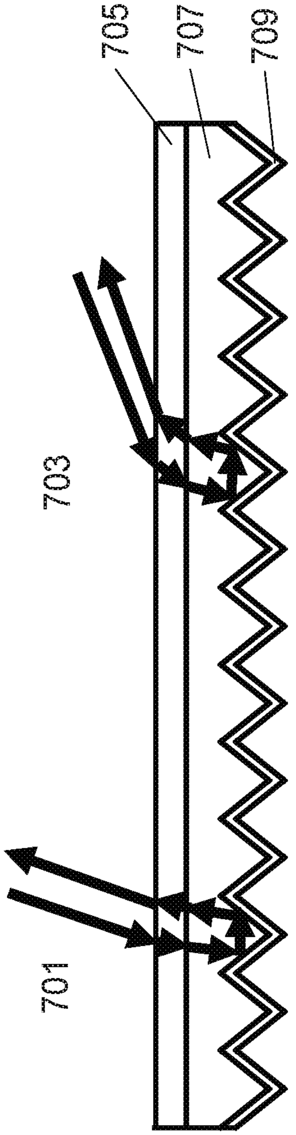
FIG. 7 shows retroreflection of radar signals by a construction having two dielectric layers.
Figure 8A:
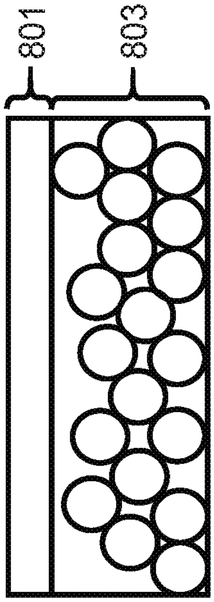
FIGS. 8A to 8F show different examples of composite dielectric layers.
Figure 8B:
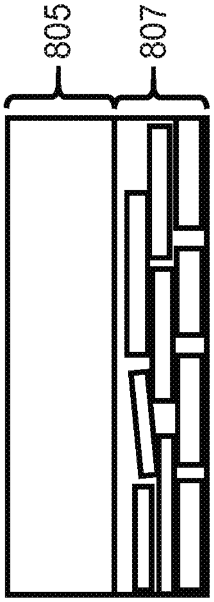
Figure 8C:
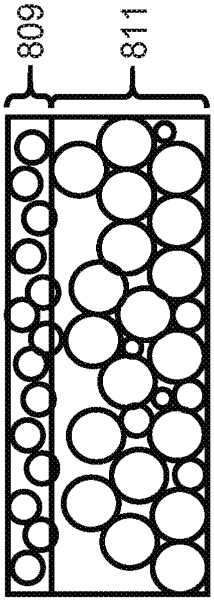
Figure 8D:
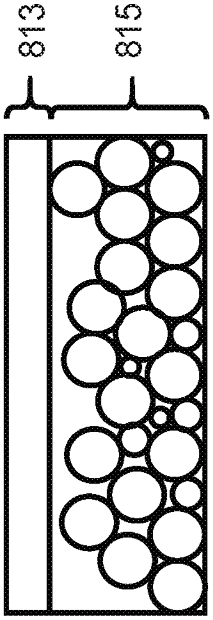
Figure 8E:
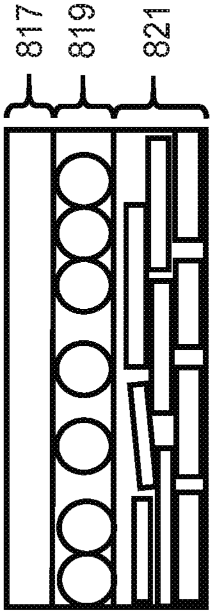
Figure 8F:
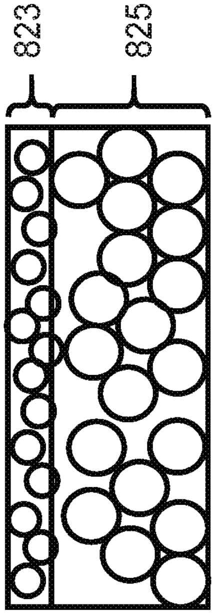

FIG. 7 shows a retroreflective sheeting comprising at least two different dielectric layers (705 and 707) in contact with each other with layer (705) having a lower permittivity than (707). As can be seen, each dielectric layer refracts the radar signal to a certain degree, even for the case of the low incidence angle signal, so that specular reflection of the signal is reduced. A substrate layer (not shown in the figure)

is usually adjacent both the reflective layer and the first dielectric layer 707. That is, the substrate layer is between the reflective layer and the first dielectric layer.

These type of step-gradient permittivity constructions provide a smooth or stepped change in permittivity from a first layer to a second layer so that the permittivity of a single layer does not have to be necessarily as high as the permittivity of an otherwise single layer would have to be in order to achieve the same level of total refraction.

In this embodiment, the reflective article comprises a first dielectric layer (707) comprising a first continuous matrix of a first material having a first relative permittivity ($\varepsilon 1$) and a second dielectric layer (705) having a second relative permittivity ($\varepsilon 2$) adjacent to the first permittivity layer. In this case, the first dielectric layer has a first thickness (T1); and the second dielectric layer has a second thickness (T2). In this case, the first permittivity $\varepsilon \mathbf{1}$ is greater than the second permittivity $\varepsilon \mathbf{2}$.

FIG. 8 shows different embodiments of dielectric layers in which elements made of a material of high permittivity are imbedded in a resin matrix having low permittivity (801, 813, 805, 817, and 823). Referring to FIG. 8(*a*), the pure resin layer 801 is optional and the composite layer 803 comprises particles of a high permittivity material in the resin matrix.

FIG. 8(*b*) shows a similar construction to that of FIG. 8(*a*), except that the high permittivity material is in the form of plates or rods to create the composite layer 807. FIG. 8(*c*) shows two separate composite layers (809 and 811), each having a different type (either different composition or different shape or both) of high permittivity material. In this embodiment, layer 811 comprises both types of high permittivity material.

FIG. 8(*d*) shows a similar construction to that of FIG. 8(*a*), except that the composite layer 815 comprises two different types (either different composition or different shape or both) of high permittivity materials.

FIG. 8(*e*) shows three separate layers (817, 819, and 821). Layer 817 is composed of the resin with no high-permittivity elements, whereas composite layers 819 and 821 each has a different type (either different composition or different shape or both) of high permittivity material.

FIG. 8(*f*) shows a similar construction to that of FIG. 8(*c*), except that the composite layer 825 comprises only one type of high permittivity material, as opposed to the two-component composite layer 815 of FIG. 8(*c*).

Figure 9:
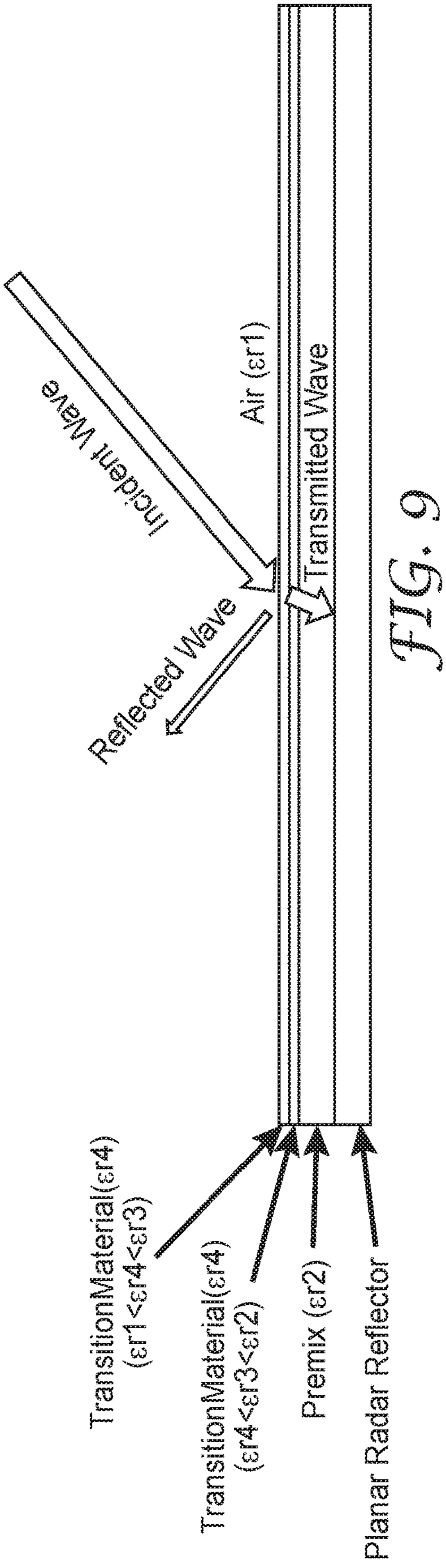
FIG. 9 shows reflection of radar signals by a construction having more than one dielectric layer with decreasing permittivity values for each layer in the direction of the outermost layer (adjacent to air) to the layer adjacent the reflective layer.

FIG. 9 shows a similar step-gradient permittivity construction to that of FIG. 7, except that FIG. 9 shows three separate dielectric layers, each having a different permittivity. In this embodiment, the permittivity increases from the lowest value of permittivity at the outermost layer (in contact with air) to the highest value in permittivity in the layer adjacent the reflective layer. The premix layer shown on this figure is equivalent to the substrate layer mentioned above for FIG. 7. In some embodiments, the premix layer (substrate layer) refers to a pavement marker composition or layer (or sets of layers corresponding to a pavement marker).

Figure 10:
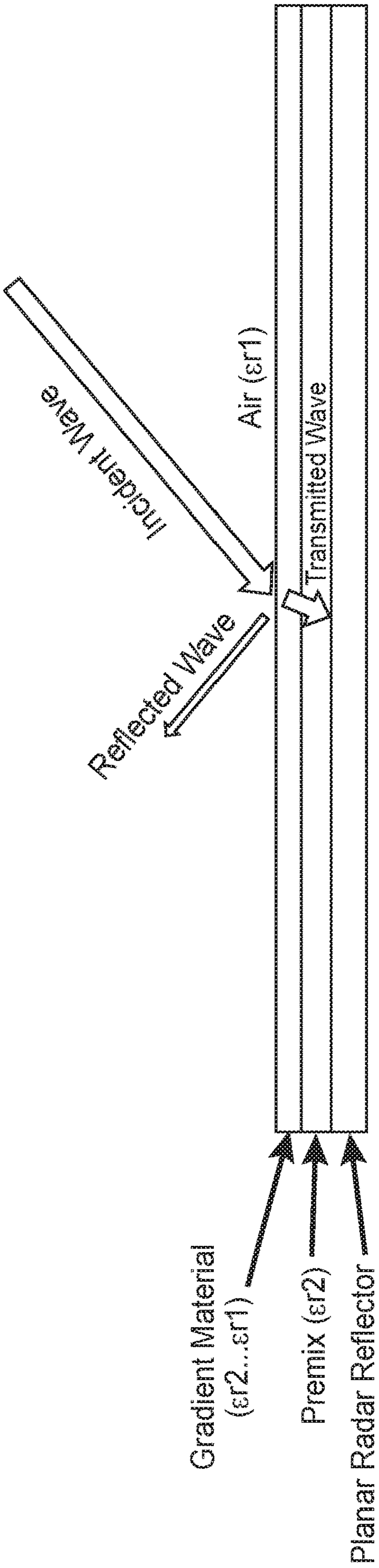
FIG. 10 shows reflection of radar signals by a construction having a dielectric layer having a gradient of decreasing permittivity values in the direction of the outermost portion (adjacent to air) to the portion adjacent the reflective layer.

FIG. 10 shows a similar construction to that of FIG. 9, except that instead of having a step-gradient for the dielectric layer, the construction in FIG. 9 shows a single dielectric layer that has a relatively continuous gradient in permittivity.

In general, the dielectric layer's permittivity varies from being closest to the permittivity of the first medium to being closest to the permittivity of the second medium. For example, the dielectric layer could have a varying permittivity that starts close to the permittivity of air (low permittivity) on one side and transitions towards a portion with high permittivity at the portion adjacent the reflective layer. This smooth or stepped transition can significantly reduce the dielectric boundary reflection that otherwise occurs at these boundary transitions.

Regarding potential uses of the reflective articles of this disclosure, as mentioned above, include reflective articles made in the form of a pavement marking tape, which may be used for marking lanes, centerlines, edges or other features of a vehicle pathway. In such examples, the dimensions of tape may conform to a suitable standard. For example, for a pavement marking for marking lanes, the material may be between about 7.5 and 30 centimeters (3 and 12 inches) wide and 30 centimeters (12 inches) long or longer. In the United States, pavement marking tapes are about 4, about 6, or about 8 inches wide (approximately 10 cm-approximately 20 cm). In Europe, pavement marking tapes are typically about 15 or about 30 centimeters wide.

In other embodiments, a reflective item may comprise an adhesive layer adjacent or immediately adjacent the reflective layer and a liner adjacent or immediately adjacent the adhesive layer. For instance, in some embodiments, and independently of other features described herein, the radar reflective article may be fabricated in the form of an adhesive tape or a self-adhesive tape. An adhesive tape comprises an adhesive layer, such as, for example, a layer of hotmelt adhesives, pressure-sensitive adhesives, UV-curable adhesives, silicone-based adhesives, urethane-based adhesives or any other suitable adhesive or combination of adhesives by which the tape can be attached to a surface of a road, a wearable item, or to other surfaces, either permanently or temporarily. Tapes for temporary attachment to a road surface may be removable from the road surface. A self-adhesive tape may comprise a layer of a pressure-sensitive adhesive for attachment to a road surface or to another surface, as well as an appropriate liner.

The reflective articles may also comprise a backing or liner layer. The backing/liner layer may include any suitable film or layer to protect the adhesive properties of adhesive layer and also prevent accidental adhesion of the article to undesired surfaces. Suitable materials for backing layer include plastic films, coated or uncoated paper, or the like. In general, the backing/liner layer may be selected so that it itself does not have strong adhesion to adhesive layer, and therefore is easily removable by hand or with limited tools.

In some embodiments, the backing layer may include a conformance layer, which may enable radar reflective article to remain substantially planar when being attached to a rough surface, for example, by conforming to uneven surfaces in a vehicle pathway or other material to which pathway article may be applied. In other words, the conformance layer may allow the reflective articles to be applied to a rough surface to conform and adhere to the surface, while ensuring that the rough surface does not substantially distort radar reflective layer.

In some embodiments, the reflective articles may comprise a thin, high abrasion resistance and/or dirt resistant coating applied to the top surface of reflective articles to protect them from traffic wear and dirt accumulation. In some preferred embodiments the protective layer may be radar and light transmissive.

In yet other embodiments, skid control particles may be partially embedded in the protective layer, or in a layer on top of protective layer. Skid control particles, may be referred to as anti-skid particles, and may be included in the upper surface of a pavement marking tape to improve the traction of vehicles.

The protective layer may be single layer or multilayer, e.g., further comprising a top film overlying underlying layers. In some examples, aliphatic polyurethanes may be used for top films because aliphatic polyurethanes properties may include clear, resistant to dirt build-up, flexible enough to conform to the road surface, bond to inorganic anti-skid particles, and resist discoloration with exposure to ultraviolet radiation.

In some embodiments, the reflective articles of this disclosure may include other human or machine detectable features, in addition to being radar reflective. For example, the reflective articles may include a colored (e.g., yellow, white, etc.) surface detectable by a human or machine vision system. That is, at least a portion of the reflective articles may be colored in the human-visible light spectrum, such that the articles are perceptible by humans. In other embodiments, a combination of opaque and light transmissive colorants may be used. In this way, the reflective articles would have effective day and nighttime colors. The colored elements may be selected to avoid interference with the functions of the radar reflective layer.

As another example, at least a portion of the reflective articles may include text, images, or other visual information. Similarly, the reflective articles may include a machine-perceptible surface. For example, at least a portion of the reflective articles may detectable via an infrared camera.

The reflective articles of this disclosure having radar-reflective properties combined with other sensible elements may provide additional advantages over other types of marking tapes or wearable items. For example, these items may be detected by other sensor systems mounted on the vehicle, such as magnetic detectors, to provide additional redundancy. This redundancy may enable the use of sensor to provide greater confidence of detection of the pavement marking or wearable item under a wider range of conditions and to enable distinction between the items of this disclosure and other radar-reflective objects in the field of view.

Exemplary Embodiments Comprising a Reflective Layer and a Multilayer Dielectric Layer or a Single Dielectric Layer with a Permittivity Gradient 1. A reflective article comprising,
a reflective layer capable of reflecting a radar signal,
a substrate layer having a permittivity $\varepsilon_s$ adjacent the reflective layer,
a first dielectric layer having a first permittivity $\varepsilon_1$ adjacent the substrate layer, and
a second dielectric layer having a second permittivity $\varepsilon_2$ adjacent the first dielectric layer,
wherein the first permittivity $\varepsilon_1$ is greater than the second permittivity $\varepsilon_2$, and the permittivity $\varepsilon_s$ is greater than the first permittivity $\varepsilon_1$.

2. A reflective article comprising,
a reflective layer capable of reflecting a radar signal,
a substrate layer having a permittivity $\varepsilon_s$ adjacent the reflective layer,
a first dielectric layer having a first permittivity $\varepsilon_1$ from 2 to 5 adjacent the substrate layer, and
a second dielectric layer having a second permittivity $\varepsilon_2$ from 1 to 2.5 adjacent the first dielectric layer, and
wherein the first permittivity $\varepsilon_1$ is greater than the second permittivity $\varepsilon_2$, and the permittivity $\varepsilon_s$ is greater than the first permittivity $\varepsilon_1$.

3. A reflective article comprising,
a reflective layer capable of reflecting a radar signal,
a substrate layer having a permittivity $\varepsilon_s$ from 1.5 to 5 adjacent the reflective layer,
a first dielectric layer having a first permittivity $\varepsilon_1$ from 2 to 5 adjacent the substrate layer, and
a second dielectric layer having a second permittivity $\varepsilon_2$ from 1 to 2.5 adjacent the first dielectric layer, and
wherein the first permittivity $\varepsilon_1$ is greater than the second permittivity $\varepsilon_2$.

4. A reflective article comprising,
a reflective layer capable of reflecting a radar signal,
a substrate layer having a permittivity $\varepsilon_s$ from 1.5 to 5 adjacent the reflective layer,
a first dielectric layer having a first permittivity $\varepsilon_1$ from 2.5 to 5 adjacent the substrate layer, and
a second dielectric layer having a second permittivity $\varepsilon_2$ from 1.5 to 3 adjacent the first dielectric layer,
a third dielectric layer having a third permittivity $\varepsilon_3$ from 1 to 2.5 adjacent the second dielectric layer, and
wherein the first permittivity $\varepsilon_1$ is greater than the second permittivity $\varepsilon_2$, and the second permittivity $\varepsilon_2$ is greater than the third permittivity $\varepsilon_3$, and the permittivity $\varepsilon_s$ is greater than the first permittivity $\varepsilon_1$.

5. A reflective article comprising,
a reflective layer capable of reflecting a radar signal,
a substrate layer having a permittivity $\varepsilon_s$ from 1.5 to 5 adjacent the reflective layer,
a first dielectric layer having a first permittivity $\varepsilon_1$ from 2 to 5, and a first thickness from 0.4 mm to 0.8 mm adjacent the reflective layer, and
a second dielectric layer having a second permittivity $\varepsilon_2$ from 1 to 2.5, and a second thickness from 0.5 mm to 0.9 mm adjacent the first dielectric layer, and
wherein the first permittivity $\varepsilon_1$ is greater than the second permittivity $\varepsilon_2$, and the permittivity $\varepsilon_s$ is greater than the first permittivity $\varepsilon_1$.

6. A reflective article comprising,
a reflective layer capable of reflecting a radar signal,
a substrate layer having a permittivity $\varepsilon_s$ adjacent the reflective layer,
a first dielectric layer having a first permittivity $\varepsilon_1$ from 2 to 5 adjacent the substrate layer, and
a second dielectric layer having a second permittivity $\varepsilon_2$ from 1 to 2.5 adjacent the first dielectric layer, wherein the first permittivity $\varepsilon_1$ is greater than the second permittivity $\varepsilon_2$, and the permittivity $\varepsilon_s$ is greater than the first permittivity $\varepsilon_1$, and
wherein at least one of the first dielectric layer or second dielectric layer is opaque.

7. A reflective article comprising,
a reflective layer capable of reflecting a radar signal,
a substrate layer having a permittivity $\varepsilon_s$ adjacent the reflective layer,
a first dielectric layer having a first permittivity $\varepsilon_1$ adjacent the substrate layer, and
a second dielectric layer having a second permittivity $\varepsilon_2$ adjacent the first dielectric layer,
wherein the first permittivity $\varepsilon_1$ is greater than the second permittivity $\varepsilon_2$, and the permittivity $\varepsilon_s$ is greater than the first permittivity $\varepsilon_1$, and
wherein the reflective layer has a first major surface and an opposing second major surface and the first major surface defines a plane of the reflective article,
wherein the combined effect of the first dielectric layer and the second dielectric layer refracts a radar signal having an incident angle of 5 degrees with respect to the plane of the reflective article at least 60 degrees (30 degrees with respect to a normal to the surface).

8. A reflective article comprising, a reflective layer capable of reflecting a radar signal, a substrate layer having a permittivity $\varepsilon_s$ adjacent the reflective layer, a dielectric layer adjacent the substrate layer having a first major surface and an opposing second major surface, wherein the first major surface of the dielectric layer is adjacent the substrate layer, wherein the dielectric layer has a gradient in permittivity from a permittivity $\varepsilon_1$ on its first major surface to a permittivity $\varepsilon_2$ on its second major surface, and wherein the permittivity $\varepsilon_1$ is greater than the permittivity $\varepsilon_2$, and the permittivity $\varepsilon_s$ is greater than the first permittivity $\varepsilon_1$.

9. A reflective article comprising, a reflective layer capable of reflecting a radar signal, a substrate layer having a permittivity $\varepsilon_s$ adjacent the reflective layer, a dielectric layer adjacent the substrate layer having a first major surface and an opposing second major surface, wherein the first major surface of the dielectric layer is adjacent the substrate layer, wherein the dielectric layer has a gradient in permittivity from a permittivity $\varepsilon_1$ on its first major surface to a permittivity $\varepsilon_2$ on its second major surface, wherein the permittivity $\varepsilon_1$ is from 2 to 5 and the permittivity $\varepsilon_2$ is from 1 to 2.5 and wherein the permittivity $\varepsilon_1$ is greater than the permittivity $\varepsilon_2$, and the permittivity $\varepsilon_s$ is greater than the first permittivity $\varepsilon_1$.

10. A reflective article comprising, a reflective layer capable of reflecting a radar signal, a substrate layer having a permittivity $\varepsilon_s$ from 1.5 to 5 adjacent the reflective layer, a dielectric layer adjacent the substrate layer having a first major surface and an opposing second major surface, wherein the first major surface of the dielectric layer is adjacent the substrate layer, wherein the dielectric layer has a gradient in permittivity from a permittivity $\varepsilon_1$ on its first major surface to a permittivity $\varepsilon_2$ on its second major surface, wherein the permittivity $\varepsilon_1$ is from 2 to 5 and the permittivity $\varepsilon_2$ is from 1 to 2.5 and wherein the permittivity $\varepsilon_1$ is greater than the permittivity $\varepsilon_2$, and the permittivity $\varepsilon_s$ is greater than the first permittivity $\varepsilon_1$.

11. A reflective article comprising, a reflective layer capable of reflecting a radar signal, a substrate layer having a permittivity $\varepsilon_s$ from 1.5 to 5 adjacent the reflective layer, a dielectric layer adjacent the substrate layer having a first major surface and an opposing second major surface, wherein the first major surface of the dielectric layer is adjacent the substrate layer, wherein the dielectric layer has a gradient in permittivity from a permittivity $\varepsilon_1$ on its first major surface to a permittivity $\varepsilon_2$ on its second major surface, wherein the permittivity $\varepsilon_1$ is from 2 to 5 and the permittivity $\varepsilon_2$ is from 1 to 2.5 and wherein the permittivity $\varepsilon_1$ is greater than the permittivity $\varepsilon_2$, and the permittivity $\varepsilon_s$ is greater than the first permittivity $\varepsilon_1$, wherein the dielectric layer has a thickness from 0.4 mm to 2 mm.

12. A reflective article comprising, a reflective layer capable of reflecting a radar signal, a substrate layer having a permittivity $\varepsilon_s$ adjacent the reflective layer, a dielectric layer adjacent the substrate layer having a first major surface and an opposing second major surface, wherein the first major surface of the dielectric layer is adjacent the substrate layer, wherein the dielectric layer has a gradient in permittivity from a permittivity $\varepsilon_1$ on its first major surface to a permittivity $\varepsilon_2$ on its second major surface, wherein the permittivity $\varepsilon_1$ is from 2 to 5 and the permittivity $\varepsilon_2$ is from 1 to 2.5 and wherein the permittivity $\varepsilon_1$ is greater than the permittivity $\varepsilon_2$, and the permittivity $\varepsilon_s$ is greater than the first permittivity $\varepsilon_1$.

wherein the reflective layer has a first major surface and an opposing second major surface and the first major surface defines a plane of the reflective article, wherein the dielectric layer refracts a radar signal having an incident angle of 5 degrees with respect to the plane of the reflective article at least 60 degrees (30 degrees with respect to a normal to the surface).

13. A reflective article comprising, a reflective layer capable of reflecting a radar signal, a substrate layer having a permittivity $\varepsilon_s$ adjacent the reflective layer, a dielectric layer adjacent the substrate layer having a first major surface and an opposing second major surface, wherein the first major surface of the dielectric layer is adjacent the substrate layer, wherein the dielectric layer has a gradient in permittivity from a permittivity $\varepsilon_1$ on its first major surface to a permittivity $\varepsilon_2$ on its second major surface, wherein the permittivity $\varepsilon_1$ is from 2 to 5 and the permittivity $\varepsilon_2$ is from 1 to 2.5 and wherein the permittivity $\varepsilon_1$ is greater than the permittivity $\varepsilon_2$, and the permittivity $\varepsilon_s$ is greater than the first permittivity $\varepsilon_1$, wherein the dielectric layer is opaque.

14. A reflective article according to any of the preceding embodiments, wherein a substrate layer has a permittivity $\varepsilon_s$ from 1.5 to 5.

15. A reflective article according to any of the preceding embodiments, wherein a substrate layer has a permittivity $\varepsilon_s$ from 2 to 5.

16. A reflective article according to any of the preceding embodiments, wherein a substrate layer has a permittivity $\varepsilon_s$ from 2.5 to 5.

17. A reflective article according to any of the preceding embodiments, wherein the first permittivity $\varepsilon_1$ ranges from 2 to 5 and the second permittivity $\varepsilon_2$ ranges from 1 to 2.5.

18. A reflective article according to any of the preceding embodiments, wherein the thickness of the gradient dielectric layer ranges from 0.4 mm to 2 mm.

19. A reflective article according to any of the preceding embodiments, wherein the first thickness ranges from 0.4 mm to 0.8 mm (or from 0.45 mm to 0.75 mm, or from 0.5 mm to 0.7 mm) and the second thickness ranges from 0.5 mm to 0.9 mm (or from 0.6 to 0.85 mm, or from 0.65 to 0.8 mm).

20. A reflective article according to any of the preceding embodiments, wherein the first permittivity $\varepsilon_1$ ranges from 2 to 5 and the second permittivity $\varepsilon_2$ ranges from 1 to 2.5, and wherein the first thickness ranges from 0.4 mm to 0.8 mm (or from 0.45 mm to 0.75 mm, or from 0.5 mm to 0.7 mm) and the second thickness ranges from 0.5 mm to 0.9 mm (or from 0.6 to 0.85 mm, or from 0.65 to 0.8 mm).

21. A reflective article according to any of the preceding embodiments, wherein at least one of the first dielectric layer or second dielectric layer is opaque.

22. A reflective article according to any of the preceding embodiments, further comprising a third dielectric layer having a third permittivity $\varepsilon_3$ adjacent the second dielectric layer, wherein the second permittivity $\varepsilon_2$ is greater than the third permittivity $\varepsilon_3$.

23. A reflective article according to any of the preceding embodiments, further comprising a third dielectric layer having a third permittivity $\varepsilon_3$ ranging from 1.5 to 3 adjacent the second dielectric layer, wherein the second permittivity $\varepsilon_2$ is greater than the third permittivity $\varepsilon_3$.

24. A reflective article according to any of the preceding embodiments, further comprising a third dielectric layer adjacent the second dielectric layer having a third permittivity $\varepsilon_3$, wherein the first permittivity $\varepsilon_1$ is from 2.5 to 5, the second permittivity $\varepsilon_2$ is from 1.5 to 3, and the third permittivity $\varepsilon_3$ is from 1 to 2.5.

25. A reflective article according to any of the preceding embodiments, further comprising a third dielectric layer adjacent the second dielectric layer having a third permittivity $\varepsilon_3$, wherein the first permittivity $\varepsilon_1$ is from 2.5 to 5, the second permittivity $\varepsilon_2$ is from 1.5 to 3, and the third permittivity $\varepsilon_3$ is from 1 to 2.5, wherein the second permittivity $\varepsilon_2$ is greater than the third permittivity $\varepsilon_3$ and wherein the third dielectric layer has a thickness ranging from 0.4 mm to 0.8 mm.

26. A reflective article according to any of the preceding embodiments, wherein the reflective layer has a first major surface and an opposing second major surface and the first major surface defines a plane of the reflective article, wherein the combined effect of the first dielectric layer and the second dielectric layer refracts a radar signal having an incident angle of 5 degrees with respect to the plane of the reflective article at least 60 degrees (30 degrees with respect to a normal to the surface)s.

27. A reflective article according to any of the preceding embodiments, wherein the reflective layer has a first major surface and an opposing second major surface and the first major surface defines a plane of the reflective article, wherein the dielectric layer refracts a radar signal having an incident angle of 5 degrees with respect to the plane of the reflective article at least 65 degrees (25 degrees with respect to a normal to the surface).

28. A reflective article according to any of the preceding embodiments, wherein the reflective layer has a first major surface and an opposing second major surface and the first major surface defines a plane of the reflective article, wherein the dielectric layer refracts a radar signal having an incident angle of 5 degrees with respect to the plane of the reflective article at least 70 degrees (20 degrees with respect to a normal to the surface).

29. A reflective article according to any of the preceding embodiments, further comprising a fourth dielectric layer having a fourth permittivity $\varepsilon_4$ adjacent the third dielectric layer, wherein the third permittivity $\varepsilon_3$ is greater than the fourth permittivity $\varepsilon_4$.

30. A reflective article according to any of the preceding embodiments, wherein the radar signal is from 76 GHz to 81 GHz.

31. A reflective article according to any of the preceding embodiments, wherein the radar signal is from 21 GHz to 27 GHz.

32. A reflective article according to any of the preceding embodiments, wherein the radar signal is from 105 GHz to 115 GHz.

33. A reflective article according to any of the preceding embodiments, wherein the reflective layer is immediately adjacent to the dielectric layer.

34. A reflective article according to any of the preceding embodiments, wherein the reflective layer comprises:

a. a retroreflective layer capable of reflecting a radar signal comprising cube corner elements having a side dimension from 2 mm to 65 mm, and b. a metallic layer coated on the cube corner elements.

35. A reflective article according to any of the preceding embodiments, wherein the reflective layer comprises a metallic layer.

36. A reflective article according to any of the preceding embodiments, wherein the reflective layer comprises a plurality of antennas.

37. A reflective article according to any of the preceding embodiments, wherein the reflective layer comprises a plurality of antennas comprising a first antenna, a second antenna that partially surrounds the first antenna, and a third antenna that partially surrounds the first antenna and the second antenna.

38. A reflective article according to any of the preceding embodiments, wherein any of the dielectric layers, independently from each other, comprises poly(methyl methacrylate), polyethylene terephthalate, polycarbonate, polyurethane, pvc, polyethylene, polypropylene, silicones, acrylates including trimethylolpropane and poly(ethyleneglycol) acrylates, and combinations thereof.

39. A reflective article according to any of the preceding embodiments, wherein any of the dielectric layers, independently from each other, comprises two or more phases.

40. A reflective article according to any of the preceding embodiments, wherein any of the dielectric layers, independently from each other, is a composite material comprising at least one material having low permittivity from 1.5 to 3.5 and at least one material having a permittivity from 20 to 50.

41. A reflective article according to any of the preceding embodiments, wherein any of the dielectric layers, independently from each other, comprises particles chosen from barium titanate, glass, oxides of the type ABO3, oxynitrides of the type AB(Ox, N1−x)3 and combinations thereof, wherein A is chose from ions Ba, Sr, Pb, Ca, Ln, lanthanide group and B is chosen from ions Ti, Nb, Cr, Bi, Nd, Zr, Cu.

42. A reflective article according to any of the preceding embodiments, wherein any of the dielectric layers, independently from each other, comprises particles having a shape chosen from spherical, elongated, plate, rod, and wherein the particles comprise a material chosen from barium titanate, glass, oxides of the type ABO3, oxynitrides of the type AB(Ox, N1−x)3 and combinations thereof, wherein A is chose from ions Ba, Sr, Pb, Ca, Ln, lanthanide group and B is chosen from ions Ti, Nb, Cr, Bi, Nd, Zr, Cu.

43. A reflective article according to any of the preceding embodiments, wherein any of the dielectric layers, independently from each other, has a permittivity from 4 to 100.

44. A reflective article according to any of the preceding embodiments, wherein any of the dielectric layers, independently from each other, has a permittivity from 4 to 50.

45. A reflective article according to any of the preceding embodiments, wherein any of the dielectric layers, independently from each other, has a permittivity from 4 to 30.

46. A reflective article according to any of the preceding embodiments, wherein any of the dielectric layers, independently from each other, has a permittivity from 4 to 20.

47. A reflective article according to any of the preceding embodiments, wherein any of the dielectric layers, independently from each other, has a permittivity from 4 to 15.

48. A reflective article according to any of the preceding embodiments, wherein any of the dielectric layers, independently from each other, has a permittivity from 4 to 10.

49. A reflective article according to any of the preceding embodiments, wherein any of the dielectric layers, independently from each other, has a permittivity from 4 to 8.

50. A reflective article according to any of the preceding embodiments, wherein the reflective article is a pavement marking.

51. A reflective article according to any of the preceding embodiments, wherein the reflective article is a traffic barrel.

52. A reflective article according to any of the preceding embodiments, wherein the reflective article is a roadway sign.

53. A reflective article according to any of the preceding embodiments, wherein the reflective article is a traffic cone.

54. A reflective article according to any of the preceding embodiments, wherein the reflective article is a guardrail.

55. A reflective article according to any of the preceding embodiments, wherein the reflective article is an automotive part.

56. A wearable article comprising a reflective article according to any of the preceding embodiments.

57. An article of clothing comprising a reflective article according to any of the preceding embodiments.

58. A helmet comprising a reflective article according to any of the preceding embodiments.

59. A badge comprising a reflective article according to any of the preceding embodiments.

60. A reflective article according to any of the preceding embodiments, further comprising a protective layer adjacent or immediately adjacent the dielectric layer.

61. A reflective article according to any of the preceding embodiments, further comprising an anticorrosion layer adjacent or immediately adjacent the reflective layer.

62. A reflective article according to any of the preceding embodiments, further comprising a substrate adjacent or immediately adjacent the reflective layer.

63. A reflective article according to any of the preceding embodiments, further comprising a substrate adjacent or immediately adjacent the dielectric layer.

64. A reflective article according to any of the preceding embodiments, further comprising an adhesive layer adjacent or immediately adjacent the reflective layer.

65. A reflective article according to any of the preceding embodiments, further comprising an adhesive layer adjacent or immediately adjacent the reflective layer and a liner adjacent or immediately adjacent the adhesive layer.

66. A reflective article according to any of the preceding embodiments, further comprising an adhesive layer adjacent or immediately adjacent the reflective layer, wherein the adhesive is chosen from thermoplastic adhesives and pressure sensitive adhesives.

Exemplary Embodiments Comprising a Retroreflective Layer and a Dielectric Layer to Diffract the Radar Signal 1. A retroreflective item comprising,
   a retroreflective layer capable of reflecting a radar signal comprising
      cube corner elements having a side dimension from 2 mm to 65 mm, and
      a metallic layer coated on the cube corner elements,
   a dielectric layer adjacent the retroreflective layer having a permittivity from 4 to 100.

2. A retroreflective item comprising,
   a retroreflective layer capable of reflecting a radar signal comprising
      cube corner elements having a side dimension from 2 mm to 65 mm, and
      a metallic layer coated on the cube corner elements,
   a dielectric layer adjacent the retroreflective layer having a permittivity from 4 to 50, and wherein the dielectric layer is opaque.

3. A retroreflective item comprising,
   a retroreflective layer capable of reflecting a radar signal comprising
      cube corner elements having a side dimension from 2 mm to 65 mm, and
      a metallic layer coated on the cube corner elements,
   a dielectric layer adjacent the retroreflective layer having a permittivity from 4 to 50, wherein the dielectric layer is opaque, and wherein the thickness of the dielectric layer is from 0.2 mm to 25 mm.

4. A retroreflective item comprising,
   a retroreflective layer capable of reflecting a radar signal comprising
      cube corner elements having a side dimension from 2 mm to 65 mm, and
      a metallic layer coated on the cube corner elements,
   a dielectric layer adjacent the retroreflective layer having a permittivity from 4 to 30, wherein the dielectric layer is opaque, wherein the thickness of the dielectric layer is from 0.2 mm to 15 mm.

wherein the retroreflective layer has a first major surface and an opposing second major surface and the first major surface defines a plane of the retroreflective item, and wherein the ratio of the radar cross section with and without the dielectric layer is greater than 3 when the radar signal has an incident angle of 5 degrees with respect to the plane of the retroreflective item.

5. A retroreflective item comprising,
   a retroreflective layer capable of reflecting a radar signal comprising
      cube corner elements having a side dimension from 2 mm to 65 mm, and
      a metallic layer coated on the cube corner elements,
   a dielectric layer adjacent the retroreflective layer having a permittivity from 4 to 30, wherein the dielectric layer is opaque, wherein the thickness of the dielectric layer is from 0.2 mm to 15 mm.

wherein the retroreflective layer has a first major surface and an opposing second major surface and the first major surface defines a plane of the retroreflective item, wherein the ratio of the radar cross section with and without the dielectric layer is greater than 3 when the radar signal has an incident angle of 5 degrees with respect to the plane of the retroreflective item, and wherein the dielectric layer refracts a radar signal having an incident angle of 5 degrees with respect to the plane of the retroreflective item at least 60 degrees (30 degrees with respect to a normal to the surface).

6. A retroreflective item comprising,
   a retroreflective layer capable of reflecting a radar signal comprising
      cube corner elements having a side dimension from 2 mm to 65 mm, and
      a metallic layer coated on the cube corner elements,
   a dielectric layer adjacent the retroreflective layer having a permittivity from 4 to 30, wherein the dielectric layer is opaque,
wherein the thickness of the dielectric layer is from 0.2 mm to 15 mm.
wherein the retroreflective layer has a first major surface and an opposing second major surface and the first major surface defines a plane of the retroreflective item,
wherein the ratio of the radar cross section with and without the dielectric layer is greater than 3 when the radar signal has an incident angle of 5 degrees with respect to the plane of the retroreflective item, and
wherein the radar signal is from 76 GHz to 81 GHz.

7. A retroreflective item according to any of the preceding embodiments, wherein the dielectric layer is opaque.

8. A retroreflective item according to any of the preceding embodiments, wherein the thickness of the dielectric layer is from 0.2 mm to 25 mm.

9. A retroreflective item according to any of the preceding embodiments, wherein the thickness of the dielectric layer is from 0.2 mm to 20 mm.

10. A retroreflective item according to any of the preceding embodiments, wherein the thickness of the dielectric layer is from 0.2 mm to 15 mm.

11. A retroreflective item according to any of the preceding embodiments, wherein the thickness of the dielectric layer is from 0.2 mm to 10 mm.

12. A retroreflective item according to any of the preceding embodiments, wherein the thickness of the dielectric layer is from 0.2 mm to 5 mm.

13. A retroreflective item according to any of the preceding embodiments, wherein the thickness of the dielectric layer is from 0.2 mm to 3 mm.

14. A retroreflective item according to any of the preceding embodiments, wherein the thickness of the dielectric layer is from 0.2 mm to 1 mm.

15. A retroreflective item according to any of the preceding embodiments, wherein the thickness of the dielectric layer is from 0.3 mm to 25 mm.

16. A retroreflective item according to any of the preceding embodiments, wherein the thickness of the dielectric layer is from 0.3 mm to 20 mm.

17. A retroreflective item according to any of the preceding embodiments, wherein the thickness of the dielectric layer is from 0.3 mm to 15 mm.

18. A retroreflective item according to any of the preceding embodiments, wherein the thickness of the dielectric layer is from 0.3 mm to 10 mm.

19. A retroreflective item according to any of the preceding embodiments, wherein the thickness of the dielectric layer is from 0.3 mm to 5 mm.

20. A retroreflective item according to any of the preceding embodiments, wherein the thickness of the dielectric layer is from 0.3 mm to 3 mm.

21. A retroreflective item according to any of the preceding embodiments, wherein the thickness of the dielectric layer is from 0.3 mm to 1 mm.

22. A retroreflective item according to any of the preceding embodiments, wherein the thickness of the dielectric layer is from 0.5 mm to 25 mm.

23. A retroreflective item according to any of the preceding embodiments, wherein the thickness of the dielectric layer is from 0.5 mm to 20 mm.

24. A retroreflective item according to any of the preceding embodiments, wherein the thickness of the dielectric layer is from 0.5 mm to 15 mm.

25. A retroreflective item according to any of the preceding embodiments, wherein the thickness of the dielectric layer is from 0.5 mm to 10 mm.

26. A retroreflective item according to any of the preceding embodiments, wherein the thickness of the dielectric layer is from 0.5 mm to 5 mm.

27. A retroreflective item according to any of the preceding embodiments, wherein the thickness of the dielectric layer is from 0.5 mm to 3 mm.

28. A retroreflective item according to any of the preceding embodiments, wherein the thickness of the dielectric layer is from 0.5 mm to 1 mm.

29. A retroreflective item according to any of the preceding embodiments, wherein the thickness of the dielectric layer is from 1 mm to 25 mm.

30. A retroreflective item according to any of the preceding embodiments, wherein the thickness of the dielectric layer is from 1 mm to 20 mm.

31. A retroreflective item according to any of the preceding embodiments, wherein the thickness of the dielectric layer is from 1 mm to 15 mm.

32. A retroreflective item according to any of the preceding embodiments, wherein the thickness of the dielectric layer is from 1 mm to 10 mm.

33. A retroreflective item according to any of the preceding embodiments, wherein the thickness of the dielectric layer is from 1 mm to 5 mm.

34. A retroreflective item according to any of the preceding embodiments, wherein the thickness of the dielectric layer is from 1 mm to 3 mm.

35. A retroreflective item according to any of the preceding embodiments, wherein the thickness of the dielectric layer is from 1.5 mm to 25 mm.

36. A retroreflective item according to any of the preceding embodiments, wherein the thickness of the dielectric layer is from 1.5 mm to 20 mm.

37. A retroreflective item according to any of the preceding embodiments, wherein the thickness of the dielectric layer is from 1.5 mm to 15 mm.

38. A retroreflective item according to any of the preceding embodiments, wherein the thickness of the dielectric layer is from 1.5 mm to 10 mm.

39. A retroreflective item according to any of the preceding embodiments, wherein the thickness of the dielectric layer is from 1.5 mm to 5 mm.

40. A retroreflective item according to any of the preceding embodiments, wherein the thickness of the dielectric layer is from 1.5 mm to 3 mm.

41. A retroreflective item according to any of the preceding embodiments, wherein the retroreflective layer has a first major surface and an opposing second major surface and the first major surface defines a plane of the retroreflective item, wherein the ratio of the radar cross section with and without the dielectric layer is greater than 3 when the radar signal has an incident angle of 5 degrees with respect to the plane of the retroreflective item.

42. A retroreflective item according to any of the preceding embodiments, wherein the retroreflective layer has a first major surface and an opposing second major surface and the first major surface defines a plane of the retroreflective item, wherein the ratio of the radar cross section with and without the dielectric layer is greater than 5 when the radar signal has an incident angle of 5 degrees with respect to the plane of the retroreflective item.

43. A retroreflective item according to any of the preceding embodiments, wherein the retroreflective layer has a first major surface and an opposing second major surface and the first major surface defines a plane of the retroreflective item, wherein the ratio of the radar cross section with and without the dielectric layer is greater than 10 when the radar signal has an incident angle of 5 degrees with respect to the plane of the retroreflective item.

44. A retroreflective item according to any of the preceding embodiments, wherein the retroreflective layer has a first major surface and an opposing second major surface and the first major surface defines a plane of the retroreflective item, wherein the ratio of the radar cross section with and without the dielectric layer is from 3 to 100 when the radar signal has an incident angle of 5 degrees with respect to the plane of the retroreflective item.

45. A retroreflective item according to any of the preceding embodiments, wherein the retroreflective layer has a first major surface and an opposing second major surface and the first major surface defines a plane of the retroreflective item, wherein the ratio of the radar cross section with and without the dielectric layer is from 3 to 50 when the radar signal has an incident angle of 5 degrees with respect to the plane of the retroreflective item.

46. A retroreflective item according to any of the preceding embodiments, wherein the retroreflective layer has a first major surface and an opposing second major surface and the first major surface defines a plane of the retroreflective item, wherein the ratio of the radar cross section with and without the dielectric layer is from 3 to 20 when the radar signal has an incident angle of 5 degrees with respect to the plane of the retroreflective item.

47. A retroreflective item according to any of the preceding embodiments, wherein the dielectric layer refracts a radar signal having an incident angle of 5 degrees with respect to the plane of the retroreflective item at least 60 degrees (30 degrees with respect to a normal to the surface).

48. A retroreflective item according to any of the preceding embodiments, wherein the dielectric layer refracts a radar signal having an incident angle of 5 degrees with respect to the plane of the retroreflective item at least 65 degrees (25 degrees with respect to a normal to the surface).

49. A retroreflective item according to any of the preceding embodiments, wherein the dielectric layer refracts a radar signal having an incident angle of 5 degrees with respect to the plane of the retroreflective item at least 70 degrees (20 degrees with respect to a normal to the surface).

50. A retroreflective item according to any of the preceding embodiments, wherein the radar signal is from 76 GHz to 81 GHz.

51. A retroreflective item according to any of the preceding embodiments, wherein the radar signal is from 21 GHz to 27 GHz.

52. A retroreflective item according to any of the preceding embodiments, wherein the radar signal is from 105 GHz to 115 GHz.

53. A retroreflective item according to any of the preceding embodiments, wherein the reflective layer is immediately adjacent to the dielectric layer.

54. A retroreflective item according to any of the preceding embodiments, wherein the retroreflective layer comprises a metallic material.

55. A retroreflective item according to any of the preceding embodiments, wherein the retroreflective layer comprises a metal chosen from silver, gold, copper or combinations thereof.

56. A retroreflective item according to any of the preceding embodiments, wherein the dielectric layer comprises poly(methyl methacrylate), polyethylene terephthalate, polycarbonate, polyurethane, pvc, polyethylene, polypropylene, silicones, acrylates including trimethylolpropane and poly(ethyleneglycol) acrylates, and combinations thereof.

57. A retroreflective item according to any of the preceding embodiments, wherein the dielectric layer and the cube corner elements are made of the same material.

58. A retroreflective item according to any of the preceding embodiments, wherein the dielectric layer comprises two or more phases.

59. A retroreflective item according to any of the preceding embodiments, wherein the dielectric layer is a composite material comprising at least one material having a permittivity from 1.5 to 3.5 and at least one material having a permittivity from 10 to 50.

60. A retroreflective item according to any of the preceding embodiments, wherein the dielectric layer is a composite material comprising at least one material having a permittivity from 1.5 to 3.5 and at least one material having a permittivity from 20 to 50.

61. A retroreflective item according to any of the preceding embodiments, wherein the dielectric layer comprises a material chosen from barium titanate, glass, oxides of the type $ABO_3$, oxynitrides of the type $AB(O_x, N_{1-x})_3$ and combinations thereof, wherein A is chose from ions Ba, Sr, Pb, Ca, Ln, lanthanide group and B is chosen from ions Ti, Nb, Cr, Bi, Nd, Zr, Cu.

62. A retroreflective item according to any of the preceding embodiments, wherein the dielectric layer comprises particles having a shape chosen from spherical, elongated, plate, rod, and wherein the particles comprise a material chosen from barium titanate, glass, oxides of the type $ABO_3$, oxynitrides of the type $AB(O_x, Ni_{1-x})_3$ and combinations thereof, wherein A is chose from ions Ba, Sr, Pb, Ca, Ln, lanthanide group and B is chosen from ions Ti, Nb, Cr, Bi, Nd, Zr, Cu.

63. A retroreflective item according to any of the preceding embodiments, wherein the dielectric layer comprises particles of a material having a permittivity from 10 to 50.

64. A retroreflective item according to any of the preceding embodiments, wherein the dielectric layer has a structure and/or composition as shown in FIG. 8.

65. A retroreflective item according to any of the preceding embodiments, wherein the side dimension of the cube corner elements is from 2 mm to 50 mm.

66. A retroreflective item according to any of the preceding embodiments, wherein the side dimension of the cube corner elements is from 2 mm to 40 mm.

67. A retroreflective item according to any of the preceding embodiments, wherein the side dimension of the cube corner elements is from 2 mm to 30 mm.

68. A retroreflective item according to any of the preceding embodiments, wherein the side dimension of the cube corner elements is from 2 mm to 20 mm.

69. A retroreflective item according to any of the preceding embodiments, wherein the side dimension of the cube corner elements is from 2 mm to 10 mm.

70. A retroreflective item according to any of the preceding embodiments, wherein the side dimension of the cube corner elements is from 2 mm to 15 mm.

71. A retroreflective item according to any of the preceding embodiments, wherein the side dimension of the cube corner elements is from 2 mm to 5 mm.

72. A retroreflective item according to any of the preceding embodiments, wherein the side dimension of the cube corner elements is from 2 mm to 4 mm.

73. A retroreflective item according to any of the preceding embodiments, wherein the side dimension of the cube corner elements is from 3 mm to 15 mm.

74. A retroreflective item according to any of the preceding embodiments, wherein the side dimension of the cube corner elements is from 3 mm to 10 mm.

75. A retroreflective item according to any of the preceding embodiments, wherein the side dimension of the cube corner elements is from 3 mm to 5 mm.

76. A retroreflective item according to any of the preceding embodiments, wherein the dielectric layer has a permittivity from 4 to 100.

77. A retroreflective item according to any of the preceding embodiments, wherein the dielectric layer has a permittivity from 4 to 50.

78. A retroreflective item according to any of the preceding embodiments, wherein the dielectric layer has a permittivity from 4 to 30.

79. A retroreflective item according to any of the preceding embodiments, wherein the dielectric layer has a permittivity from 4 to 20.

80. A retroreflective item according to any of the preceding embodiments, wherein the dielectric layer has a permittivity from 4 to 15.

81. A retroreflective item according to any of the preceding embodiments, wherein the dielectric layer has a permittivity from 4 to 10.

82. A retroreflective item according to any of the preceding embodiments, wherein the dielectric layer has a permittivity from 4 to 8.

83. A retroreflective item according to any of the preceding embodiments, wherein the surface of the dielectric layer not adjacent the retroreflective layer has increased surface roughness with respect to an untreated dielectric layer surface.

84. A retroreflective item according to any of the preceding embodiments, wherein the retroreflective item is a pavement marking.

85. A retroreflective item according to any of the preceding embodiments, wherein the retroreflective item is a traffic barrel.

86. A retroreflective item according to any of the preceding embodiments, wherein the retroreflective item is a traffic cone.

87. A retroreflective item according to any of the preceding embodiments, wherein the retroreflective item is a roadway sign.

88. A retroreflective item according to any of the preceding embodiments, wherein the retroreflective item is a guardrail.

89. A retroreflective item according to any of the preceding embodiments, wherein the retroreflective item is an automotive part.

90. A wearable article comprising a retroreflective item according to any of the preceding embodiments.

91. An article of clothing comprising a retroreflective item according to any of the preceding embodiments.

92. A helmet comprising a retroreflective item according to any of the preceding embodiments.

93. A badge comprising a retroreflective item according to any of the preceding embodiments.

94. A retroreflective item according to any of the preceding embodiments, further comprising a protective layer adjacent or immediately adjacent the dielectric layer.

95. A retroreflective item according to any of the preceding embodiments, further comprising an anticorrosion layer adjacent or immediately adjacent the metallic layer.

96. A retroreflective item according to any of the preceding embodiments, further comprising a substrate adjacent or immediately adjacent the retroreflective layer.

97. A retroreflective item according to any of the preceding embodiments, further comprising a substrate adjacent or immediately adjacent the metallic layer.

98. A retroreflective item according to any of the preceding embodiments, further comprising an adhesive layer adjacent or immediately adjacent the retroreflective layer.

99. A retroreflective item according to any of the preceding embodiments, further comprising an adhesive layer adjacent or immediately adjacent the retroreflective layer and a liner adjacent or immediately adjacent the adhesive layer.

100. A retroreflective item according to any of the preceding embodiments, further comprising an adhesive layer adjacent or immediately adjacent the retroreflective layer, wherein the adhesive is chosen from thermoplastic adhesives and pressure sensitive adhesives.

101. A retroreflective item according to any of the preceding embodiments, further comprising a set of dielectric layers (or a single dielectric layer with a permittivity gradient) as described in any of the embodiments preceding the embodiments section.

Examples

Unless otherwise noted or readily apparent from the context, all parts, percentages, ratios, etc. in the Examples and the rest of the specification are by weight.

Conducted computational modeling of prismatic retroreflectors with a metallic coating and comparing a baseline sample where air is adjacent to the radar source side of the prismatic layer to samples of the invention where different dielectric layers are adjacent to the prismatic layer. The model simulated a radar signal incident on the samples at various angles while calculating the RCS of the samples. Sample parameters that were varied include: the permittivity of the dielectric layer, the thickness of the dielectric layer, the element size of the retroreflector. Some models include a weathering layer adjacent to the dielectric layer, where the weathering layer has permittivity values similar to a layer of dust or dirt, to determine the impact on RCS performance.

Computational Modeling Section

Test Methods for Computational Modeling

Modeling was conducted by electromagnetic modeling tool, CST Microwave studio. The RCSs (Radar CrossSection) of samples were calculated with and without a dielectric layer.

a. 1st Sample without a Dielectric Layer

Figure 11:
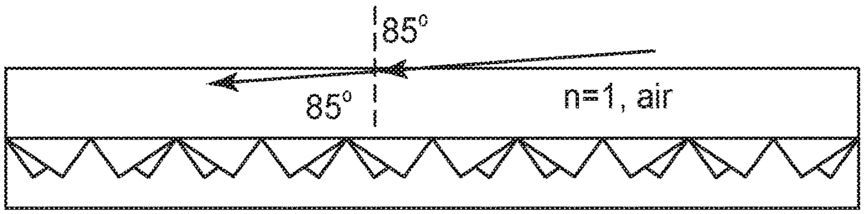
FIG. 11 shows a cross section of an optical retroreflector without a dielectric layer.
Figure 12:
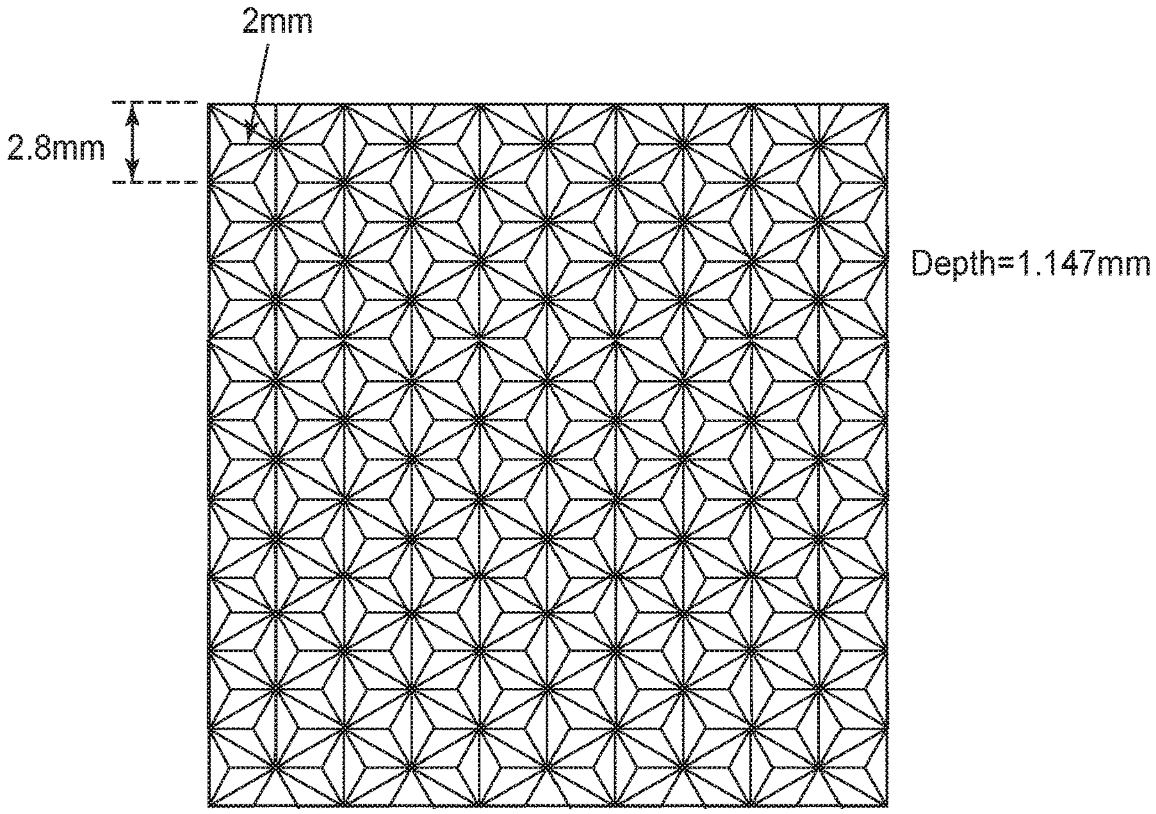
FIG. 12 shows a plane view of optical retroreflector without a dielectric layer.

The size of a sample is 25 mm×25 mm and the dimension of the retroreflector is in FIG. 12 and the incident radar signal is coming from 85° with regard to the perpendicular axis to the plane of the retroreflector (FIG. 11).

b. 2nd Sample with a Dielectric Layer (Permittivity=4.8)

Figure 13:
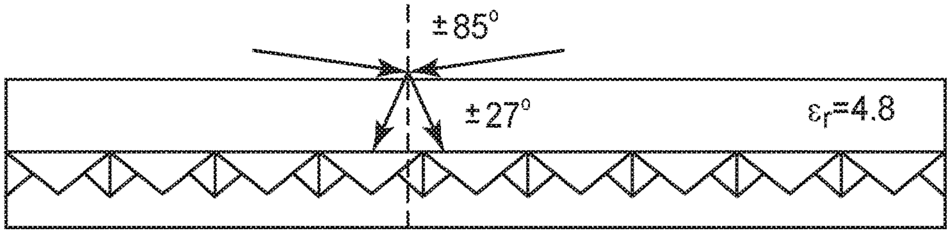
FIG. 13 shows a cross section of an optical retroreflector with a dielectric layer having a permittivity of 4.8.

See FIG. 13.

c. 3rd Sample with a Dielectric Layer (Permittivity=8)

Figure 14:
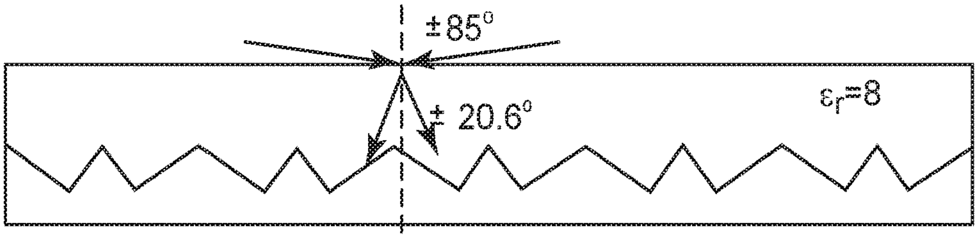
FIG. 14 shows a cross section of an optical retroreflector with a dielectric layer having a permittivity of 8.

See FIG. 14.

Here is the calculated RCS results for 3 samples with 85° incident radar signals.

| @78 GHz | RCS [$mm^2$] |
|---|---|
| air | 1,724 |
| Permittivity = 4.8 | 16,560 |
| Permittivity = 8 | 28,010 |

d. Additional Layer Stacking Due to Weather and Dust

Figure 15A:
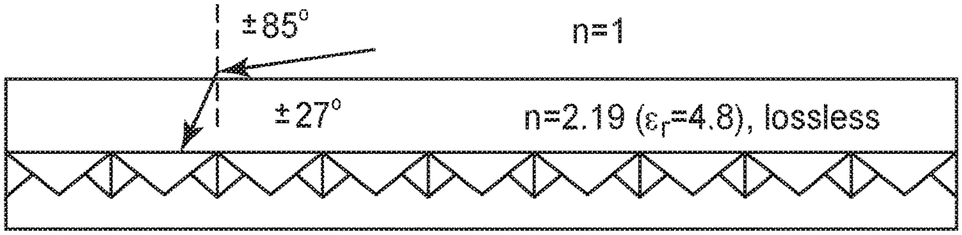
FIG. 15A shows a cross section of an optical retroreflector with a dielectric layer having a permittivity of 4.8.
Figure 15B:
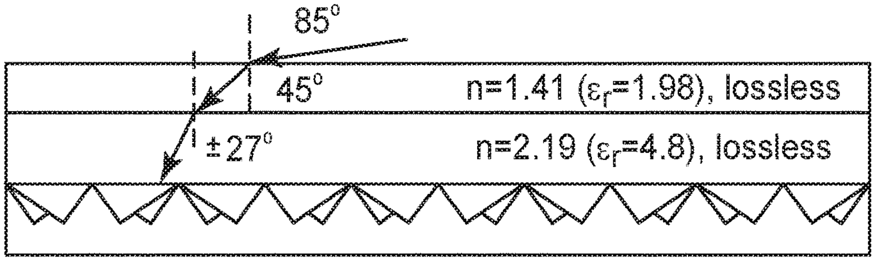
FIG. 15B shows a cross section of an optical retroreflector with a dielectric layer having a permittivity of 4.8 and an additional layer stacking having a permittivity of 1.98.

For real applications, the rain, snow, dust and etc. should be considered for retroreflection performance degradation. If there is no dielectric layer on top of the retroreflector, this additional layer stacking will directly cause EM wave refraction which will critically change the retroreflection performance. But with a dielectric layer on it, the incident angle at retroreflector surface will not be changed regardless of any additional layer stacking on the dielectric layer due to rain, snow, dust and etc. as shown in FIG. 15.

e. Different Thickness of the Dielectric Layer (Permittivity=8): 500 Um/1 mm/2 mm

| Dielectric layer thickness | RCS ($mm^2$) at 78 GHz |
|---|---|
| 500 um | 16,300 |
| 1 mm | 18,000 |
| 2 mm | 28,010 |

Prophetic Example Section

Test Methods for Prophetic Experiment

Figure 16:
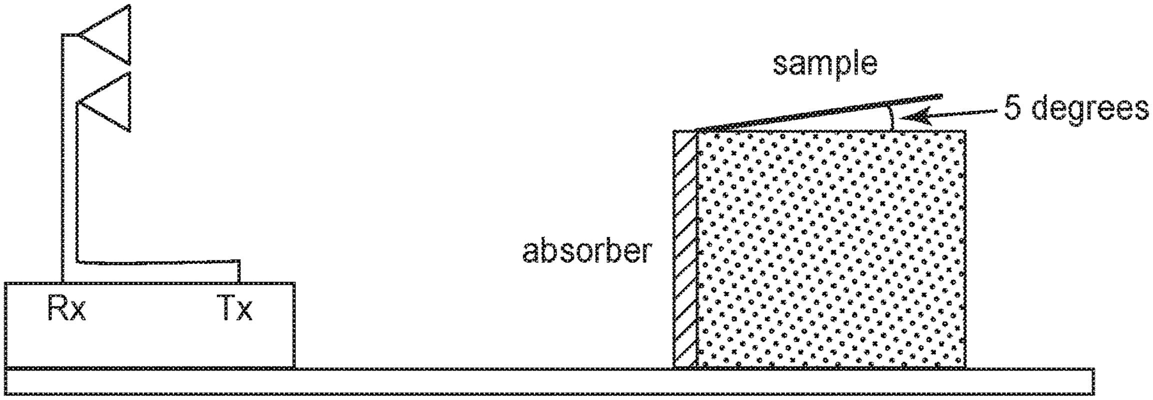
FIG. 16 shows the experimental set up to measure the radar cross section (RCS) of a material, as described in the Examples.

For RCS measurements, one set of standard antennas at 77 GHz are used. One is as a transmitter antenna (Tx) and the other is as a receiver antenna (Rx). See FIG. 16. These antennas are located next to each other facing the samples presenting the same angle to the samples. A transmitter antenna is connected to a radio frequency signal generator and the receiver antenna is connected to the spectrum analyzer. Samples are placed on a flat surface, which is non-retroreflective to radar signals.

RCS is calculated by measuring the transmitted power and the received power by calculating the power loss by subtracting the transmitted and received power at the terminals. This power reduction is partly due to losses in connecting cables and free space, depending on the cable properties and distance between sample and antennas. If transmitting antenna and cables are identical to those of receiving side, the ratio of received power and transmitted power gives the RCS.

Preparatory Prophetic Examples

One sample is comprised of a silicone prismatic substrate with a vapor coated silver metallic layer atop the prismatic layer. This sample does not have a dielectric layer and acts as a comparative sample. Another sample has the silicone prismatic substrate and vapor coated silver metallic layer but also includes a dielectric layer atop the silver layer.

A silicon prismatic substrate is replicated from 3D print mold. And then a silver conductive layer is coated on top of a silicon substrate. After silver coating, a dielectric layer is coated.

Figure 17:
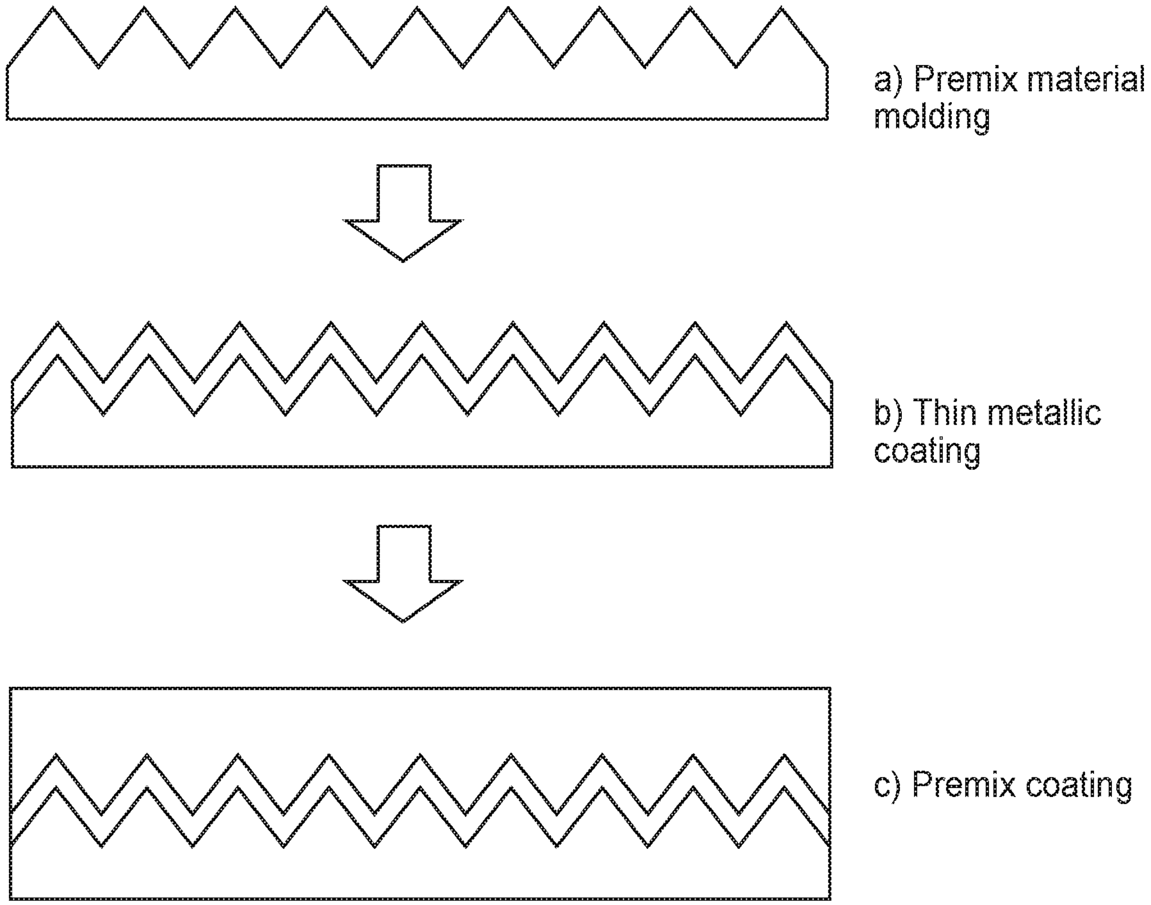
FIG. 17 shows an example of the manufacturing process to embed the reflector array into the matrix.

FIG. 17 is an example of the manufacturing process to embed the reflector array into the matrix. The matrix can be flexible depending on the applications.

Preparation of various dielectric layers is described below.

1: One Continuous Phase, One Discontinuous High-Permittivity Dielectric Material A first particulate high dielectric, low loss material with maximum particle size of ~100-200 microns is dispersed into an continuous phase of relatively low viscosity (10,000 cP or less) until uniformly mixed. This continuous phase might be a mixture of low loss carbon-based or silicon-based monomers/oligomers, or a solution of a polymer, or a combination, and has a dielectric constant lower than the discontinuous phase. The high dielectric material has a density higher than the continuous phase. This mixture is coated onto the metallized layer by a suitable method (e.g. slot die, gravure coating, flood coating). Sufficient residence time is provided before the coating solution becomes solid that the dense high dielectric phase settles toward the cavities in the metallized layer, producing a gradient in dielectric constant from a lower value at the air interface to a higher value at the metallized interface. Solidification of the coating may be achieved by drying in an oven, curing reactive species in an oven, exposure to actinic radiation, or some combination of all three processes. The composition may also include leveling agents, dispersants, drying agents.

Another example of one continuous phase with one discontinuous high-permittivity dielectric material includes a discontinuous phase in which the shape of at least one discontinuous phase has an aspect ratio of width to thickness greater than 10. This phase can be exhibit either a (i) rod-like or (ii) plate-like morphology. This high aspect ratio discontinuous phase has a density higher than the continuous phase. Both continuous and discontinuous phases can be deposited in the same process (see examples above), and discontinuous plate phase is given sufficient residence time after coating to settle and form an aligned structure with the long direction roughly parallel to the air-dielectric surface.

2. One Continuous Phase, Two Discontinuous Dielectrics

The same procedure described immediately above in 1 is followed, but the composition also includes particles in same size range that are both less dense and have a lower dielectric coefficient than the continuous phase (e.g. glass bubbles)

3. One Continuous Phase, One Discontinuous Dielectric Added, and One Discontinuous Dielectric Added Via Process The same procedure described above in 1 is followed, except that composition also may contain a surfactant, and composition is lightly frothed prior to coating so that bubbles rise and create air voids in the solidified coating while denser particles settle 4. One Continuous Phase, One Discontinuous Dielectric Added, and One Discontinuous Dielectric Added Via Process Two-layer coextrusion with 1) coated as bottom layer and 2) or frothed layer without dielectric added as layer closest to air interface

We claim:

1. A retroreflective item comprising,
- a retroreflective layer capable of reflecting a radar signal comprising,
  - cube corner elements having a side dimension from 2 mm to 65 mm,
  - a metallic layer coated on the cube corner elements, and
  - a dielectric layer adjacent the retroreflective layer having a permittivity from 4 to 30,
- wherein the dielectric layer is opaque,
- wherein the thickness of the dielectric layer is from 0.2 mm to 15 mm,
- wherein the retroreflective layer has a first major surface and an opposing second major surface and the first major surface defines a plane of the retroreflective item,
- wherein the ratio of the radar cross section with and without the dielectric layer is greater than 3 when the radar signal has an incident angle of 5 degrees with respect to the plane of the retroreflective item.

2. The retroreflective item according to claim 1, wherein the thickness of the dielectric layer is from 0.2 mm to 10 mm.

3. The retroreflective item according to claim 1, wherein the dielectric layer refracts a radar signal having an incident angle of 5 degrees with respect to the plane of the retroreflective item at least 60 degrees (30 degrees with respect to a normal to the surface).

4. The retroreflective item according to claim 1, wherein the radar signal is from 76 GHz to 81 GHz.

5. The retroreflective item according to claim 1, wherein the radar signal is from 21 GHz to 27 GHz.

6. The retroreflective item according to claim 1, wherein the radar signal is from 105 GHz to 115 GHz.

7. The retroreflective item according to claim 1, wherein the reflective layer is immediately adjacent to the dielectric layer.

8. The retroreflective item according to claim 1, wherein the retroreflective layer comprises a metallic material.

9. The retroreflective item according to claim 1, wherein the dielectric layer comprises poly(methyl methacrylate), polyethylene terephthalate, polycarbonate, polyurethane, pvc, polyethylene, polypropylene, silicones, acrylates including trimethylolpropane and poly(ethyleneglycol) acrylates, and combinations thereof.

10. The retroreflective item according to claim 1, wherein the side dimension of the cube corner elements is from 2 mm to 20 mm.

11. The retroreflective item according to claim 1, wherein the dielectric layer has a permittivity from 4 to 20.

12. The retroreflective item according to claim 1, wherein the retroreflective item is a pavement marking.

13. The retroreflective item according to claim 1, further comprising an adhesive layer adjacent or immediately adjacent the retroreflective layer.

14. The retroreflective item according to claim 1, further comprising an adhesive layer adjacent or immediately adjacent the retroreflective layer and a liner adjacent or immediately adjacent the adhesive layer.

* * * * *